United States Patent
Allinson et al.

(10) Patent No.: US 11,848,467 B2
(45) Date of Patent: Dec. 19, 2023

(54) CARBON-NEUTRAL PROCESS FOR GENERATING ELECTRICITY

(71) Applicant: THE CLAIRE TECHNOLOGIES CORPORATION, Danville, CA (US)

(72) Inventors: Paul A. Allinson, Danville, CA (US); Curtis L. Munson, Oakland, CA (US); Steven F. Sciamanna, Orinda, CA (US); Alan W. Klaassen, Kensington, CA (US)

(73) Assignee: Claire Technologies Corp., Danville, CA (US)

( * ) Notice: Subject to any disclaimer, the term of this patent is extended or adjusted under 35 U.S.C. 154(b) by 3 days.

(21) Appl. No.: 17/497,903

(22) Filed: Oct. 9, 2021

(65) Prior Publication Data

US 2022/0115682 A1    Apr. 14, 2022

Related U.S. Application Data

(60) Provisional application No. 63/091,425, filed on Oct. 14, 2020.

(51) Int. Cl.
*H01M 8/0612* (2016.01)
*C01B 3/26* (2006.01)
(Continued)

(52) U.S. Cl.
CPC .............. *H01M 8/0656* (2013.01); *C01B 3/26* (2013.01); *C25B 1/04* (2013.01); *C25B 5/00* (2013.01);
(Continued)

(58) Field of Classification Search
CPC .............. C01B 2203/0277; C01B 3/22; C01B 2203/066; C01B 3/26; C01B 2203/0811;
(Continued)

(56) References Cited

U.S. PATENT DOCUMENTS

| 4,567,033 A | 1/1986 | Kesten |
| 7,045,230 B2 | 5/2006 | Rusta-Sellehy |

(Continued)

FOREIGN PATENT DOCUMENTS

DE    102014006430 A1    11/2015

OTHER PUBLICATIONS

Materials Article: Hydrogen Production from the LOHC Perhydro-Dibenzyl-Toluene and Purification Using a 5 um PdAg-Membrane in a Coupled Microstructured System; Alexander Wunsch, Tatjana Berg and Peter Pfeifer 2020.
(Continued)

*Primary Examiner* — Imran Akram
(74) *Attorney, Agent, or Firm* — Peter Tormey; A T & P PC

(57) ABSTRACT

A method is described for generating carbon-neutral electricity using purified hydrogen as an energy source. A recyclable LOHC is provided to the process for reversible dehydrogenation. Hydrogen generated by dehydrogenation is purified and electrochemically converted to electricity. Heat for maintaining the dehydrogenation reaction temperature is derived from combustion of a portion of the liquid products from dehydrogenation, the portion combusted being less than or equal to the portion of carbon-neutral component included in the recyclable LOHC.

30 Claims, 6 Drawing Sheets

(51) Int. Cl.
  *H01M 8/0656* (2016.01)
  *C25B 1/04* (2021.01)
  *C25B 5/00* (2006.01)

(52) U.S. Cl.
  CPC ..... *H01M 8/0612* (2013.01); *C01B 2203/066* (2013.01); *C01B 2203/1211* (2013.01); *C01B 2203/1235* (2013.01); *C01B 2203/84* (2013.01); *H01M 2250/20* (2013.01)

(58) Field of Classification Search
  CPC .. C01B 3/0015; C01B 3/0005; H01M 8/0612; H01M 8/0606
  See application file for complete search history.

(56) References Cited

U.S. PATENT DOCUMENTS

| | | | |
|---|---|---|---|
| 7,261,961 | B2 | 8/2007 | Kamachi et al. |
| 7,485,161 | B2 | 2/2009 | Toseland et al. |
| 10,396,388 | B2 | 8/2019 | Andres et al. |
| 10,793,000 | B2 | 10/2020 | Kondo |
| 2010/0151292 | A1 | 6/2010 | Frick et al. |
| 2011/0003218 | A1 | 1/2011 | Stolte et al. |
| 2018/0053957 | A1 | 2/2018 | Pez et al. |
| 2018/0290117 | A1 | 10/2018 | Rathke et al. |
| 2019/0292048 | A1 | 9/2019 | Kusche et al. |
| 2019/0309904 | A1 | 10/2019 | Kusche et al. |
| 2020/0235414 | A1 | 7/2020 | Teichmann et al. |
| 2021/0280887 | A1* | 9/2021 | Pez ............ H01M 8/103 |
| 2022/0024758 | A1* | 1/2022 | Milstein ............ C01B 3/0015 |
| 2022/0073344 | A1* | 3/2022 | Milstein ............ B01J 31/189 |

OTHER PUBLICATIONS

Energies Review: Potential Liquid-Organic Hydrogen Carrier (LOHC) Systems: A Review on Recent Progress; Purna Chandra Rao and Minyoung Yoon 2020.

\* cited by examiner

CARBON-NEUTRAL PROCESS FOR GENERATING ELECTRICITY

PRIORITY

This application claims the benefit of the priority of U.S. provisional patent application Ser. No. 63/091,425, entitled "Carbon-Neutral Process for Generating Electricity", filed on Oct. 14, 2020, which is hereby incorporated in its entirety by reference herein.

FIELD OF THE INVENTION

This disclosure relates generally to a carbon-neutral process for generating electricity and to a liquid organic hydrogen carrier (LOHC) for supplying hydrogen for generating the carbon-neutral electricity. More specifically, this disclosure relates to methods of use of regenerable carbon-neutral compositions consisting of liquid organic hydrogen carriers used in processes to supply hydrogen to generate electricity under carbon-neutral conditions using processes and apparatus operating with a net zero atmospheric emission of carbon oxides.

BACKGROUND OF THE INVENTION

The invention relates to the field of electricity generation. Systems employing battery storage to supply electricity are known and readily available. But systems that depend exclusively on battery electrical storage are limited in battery capacity, limited by battery weight, and limited in operating time by the extended battery recharging time required.

A great deal of effort has been expended in developing systems that convert chemical energy into electricity. Having the capability of loading a gaseous, liquid, or solid material in the system for hydrogen conversion into electricity greatly increases the flexibility for the developing electrified economy. Hydrogen has been acknowledged for many years as a potential source of electrical energy by electrochemical hydrogen conversion that generates electrical energy. Hydrogen may be stored as a compressed gas or as liquid hydrogen at cryogenic temperatures. However, increasing the operating flexibility of an electric powered vehicle by providing high pressure hydrogen for electrochemical conversion and generation of additional electrical energy requires the storage of high-pressure hydrogen, along with its not insignificant associated risks. Furthermore, the lack of a hydrogen delivery infrastructure in virtually all locations limits applicability of a high-pressure hydrogen solution. Hydrogen may be stored as the captured or contained gas in various carrier media such as metal hydrides, high surface area carbon materials, and metal-organic framework materials. Generally, the contained hydrogen in such carrier media can be released by raising the temperature and/or lowering the hydrogen pressure.

Hydrogen can also be stored by means of reversible catalytic hydrogenation of unsaturated, usually aromatic, organic compounds. An organic hydrogen carrier, referred to herein as a "liquid organic hydrogen carrier" (LOHC), is generally liquid at ambient conditions, and contains a significant amount of chemically bound hydrogen that may be liberated by an elevated temperature catalytic process. The release of hydrogen by dehydrogenation is an endothermic process, i.e., one which requires an input of heat, at a temperature where the dehydrogenation of the carrier can proceed with adequate reaction rates. A number of methods have been suggested for generating the heat required to maintain the dehydrogenation reaction step, including combustion of hydrogen that is generated in the process, or combustion of a supplied fuel to provide the necessary heat. Using generated hydrogen as combustion fuel has a significant impact on hydrogen availability for generating electricity. Burning a combustion fuel in the conventional method for heat generation creates greenhouse emissions, which serves to neutralize the benefit of using hydrogen as a source of system energy.

Conventional use of LOHC feedstocks as hydrogen carriers has had limited success on account of the relatively low efficiency of energy conversion, the challenges of operating a dehydrogenation reaction zone within size constraints while maintaining acceptable catalyst activity, and the requirement for generating thermal energy without using a portion of the generated hydrogen for thermal energy production and while maintaining carbon-neutral operation with hydrocarbon combustion.

Fossil fuels (e.g., coal, oil, and natural gas) have been powering economies for over 302 years, and currently supply over 80 percent of the world's energy. It is well established combustion of fossil fuels produces undesirable emissions such as greenhouse gases.

Atmospheric greenhouse gases are harmful to the environment because they absorb infrared radiation (IR) which is subsequently released and reflected into the atmosphere, thereby increasing the mean planetary temperature over time.

Rising global warming challenges due to greenhouse gas emissions necessitates a shift in the world's energy economies to alternative energy sources such as battery, solar and wind. Unfortunately, these alternative energy sources only makeup only about twenty percent of the world's current total energy economy.

Further, governmental regulating authorities continue to reduce the allowable greenhouse gas emissions for various fossil fuel emissions sources, including new vehicles.

Society is turning towards carbon-neutral (CN) electricity as it moves away from fossil fuels in an effort to significantly reduce Green House Gas (GHG) emissions. Electric Vehicles (EVs) are beginning to make an impact in the passenger car and pickup truck market, and they are anticipated to penetrate the short and medium-haul truck market. Limitations in energy density currently limit battery use in Class 7/8 long-haul tractor-trailers, trains, shipping, and aircraft. Battery banks are used to load-balance certain utility grids for short durations, typically 4 hours or less, but cannot support large back-up energy needs.

Hydrogen has been acknowledged for many years as a potential large-scale source of energy ("hydrogen economy"). Hydrogen is a powerful fuel and produces on a mass basis three times the energy content of gasoline (120 MJ/kg vs. 44 MJ/kg). Further, combustion of hydrogen does not produce environmentally harmful IR-absorbing gas emissions.

However, numerous technical challenges are inhibiting the shift to a large-scale hydrogen economy. These challenges include, among other things, the difficulty of developing large scale long-term, safe delivery and storage infrastructures for compressed hydrogen.

Carbon-neutral systems utilizing hydrogen are known and readily available but currently available systems generally require high pressure compression in the 10,000-psig region for storage and use in fuel cells. A national high pressure hydrogen distribution infrastructure does not exist and is estimated to cost hundreds of billions of dollars to install.

Systems utilizing LOHCs to transport labile hydrogen via existing fossil fuel delivery systems to remote sites where, after dehydrogenation, they provide hydrogen to power fuel cells are known, but they cannot currently operate in a carbon-neutral (CN) mode without a CN external power or heat supply.

There have been efforts to eliminate IR-absorbing gas emissions from LOHC-based hydrogen production processes. However, this method requires the generation and/or storage of a sufficient amount of electricity to ensure continued operations of the hydrogen production process.

Current methods also require additional electrical storage and battery management equipment. In addition, drawing electricity for the heating element from downstream equipment (e.g., a fuel cell) reduces the amount of electricity available for the target application (e.g., powering an electrical motor in a vehicle).

Others have suggested combusting produced hydrogen to generate the heat for dehydrogenation of the LOHC. However, this method lowers the amount of hydrogen available for use by downstream equipment (e.g., a hydrogen fuel cell), thereby reducing the efficiency of the overall system.

One approach known in the art employs a combustible/evaporable fossil fuel or biofuel additive to the LOHC feed. The additive is then separated during the hydrogen production process and combusted to form heat for dehydrogenation of the LOHC. However, combustion of the additive produces IR-absorbing gas emissions, thereby increasing the total atmospheric concentration of these harmful gases, and requires separation of the additive prior to combustion, adding an additional process step. Furthermore, the additive decreases the amount of LOHC in the total feed, thereby reducing the amount of hydrogen produced as compared to a feed containing 100% LOHC.

Accordingly, there is a need for a LOHC-based process for producing hydrogen which eliminates or reduces the net increase in atmospheric GHG emissions, and which is not completely reliant on chemical or energy products (e.g., hydrogen and electricity) needed by downstream equipment such as for example fuel cells, hydrogen internal combustion engines, and the like.

SUMMARY OF THE INVENTION

In one aspect, the compositions, methods and apparatus described herein provide for a scalable system for generating, storing, and delivering CN energy at ambient conditions integrated into a carbon-neutral energy facility (CNEF).

In another aspect, a scalable system is disclosed herein designed for use in green-fields, brown-fields and to complement existing oil refineries and chemical plants maximizing the use of their existing infrastructure.

In yet another aspect, a scalable system is disclosed herein that operates to complement and balance renewable electrical generating systems by utilizing excess electrical energy to electrolyze water into hydrogen and oxygen when excess power is available and to convert the stored hydrogen into electricity during periods of electrical deficit.

In a further aspect, a scalable system is disclosed herein that may be configured to function as a rehydrogenation facility that is transportable to location for reloading liquid organic hydrogen carriers (LOHCs) with CN hydrogen for local use.

In another aspect, a cyclic process is disclosed herein that is suitable for generating electricity from one or more renewable sources using low-pressure hydrogen either provided from external sources or generated internally within the process.

In yet another aspect, a cyclic process is disclosed herein that employs a regenerable LOHC produced after the use of a primary LOHC to generate electricity wherein spent LOHC is regenerated with hydrogen that is sourced from a carbon-neutral source of energy, including electricity from renewable sources including geothermal, hydroelectric, solar, wind, water and the like, and stored energy derived therefrom.

In yet another aspect, additional step-wise processes and devices capable of performing those processes are disclosed herein employing methods to store and release electrical energy in the form of chemical energy within interconvertible LOHC compositions having labile hydrogen content, using carbon-neutral sources of hydrogen and electrical energy so that no net release or addition to the level of atmospheric carbon occurs.

In yet a further aspect, processes and devices capable of performing those processes are disclosed herein employing methods to recharge labile hydrogen depleted LOHC compositions with hydrogen, using carbon-neutral sources of hydrogen and electrical energy so that no net release or addition to the level of atmospheric carbon occurs.

In yet a further aspect, processes and devices capable of performing those processes are disclosed herein employing methods to harvest labile hydrogen from regenerated and hydrogen enriched LOHC compositions to generate electrical energy under conditions that result in no net release or addition to the level of atmospheric carbon.

The present invention is directed to a process for generating carbon-neutral electricity using hydrogen as the energy source.

In one aspect, the invention provides a recyclable Liquid Organic Hydrogen Carrier (recyclable LOHC) and a process for operating a hybrid hydrogen-electric vehicle having the range of travel and ease of refueling generally available with internal combustion engine vehicles, while maintaining carbon-neutral emissions during vehicle operation. The vehicle has a hybrid power system, using a combination of battery storage for providing electrical energy for vehicle propulsion, and an recyclable LOHC supplied to the vehicle for generating hydrogen by catalytic dehydrogenation, the hydrogen then being electrochemically converted on-board the vehicle to produce electrical energy for operating and propelling the vehicle. The produced electrical energy may be used directly to operate the vehicle or stored in on-board battery storage for use as needed.

In one aspect, the invention provides a recyclable LOHC and a process for renewable electricity storage in stationary devices via hydrogen electrochemical conversion. The recyclable LOHC is available for conversion to hydrogen and an unloaded aromatic substrate as electrical energy demand changes, for generation of carbon-neutral electricity via the hydrogen and for recycling of at least a portion of the unloaded aromatic substrate for reuse as a component of the recyclable LOHC. In one aspect, the heat energy for dehydrogenation may be provided by combustion internal to a stationary device, or the heat energy may be supplied from an external source, such as external renewable electricity.

In one aspect, the invention provides a process using a recyclable LOHC that is chemically stable and normally liquid at ambient conditions. In one aspect, the invention provides a low-cost LOHC blend that balances the available supplies of carbon-neutral and conventionally sourced hydrogen-rich hydrocarbons for carbon-neutral electricity.

In one aspect, the process is a hydrogen-to-electricity process. As used herein, the phase "hydrogen-to-electricity" refers to the electrochemical conversion of hydrogen to electricity. An electrochemical conversion device used in the hydrogen-to-electricity process may be a fuel cell, such as a PEMFC or a SOFC, for oxidizing hydrogen with oxygen from air supplied to the device, producing at least water and an external electrical current. An organic hydrogen carrier, such as the recyclable LOHC, may supply the hydrogen through catalytic dehydrogenation. At least a portion of the unloaded aromatic substrate recovered from the dehydrogenation step may be recycled as recycle liquid and catalytically hydrogenated to generate additional recyclable LOHC.

In one aspect, the process uses hydrogen as an energy source for generating carbon-neutral electrical energy, and the process may comprise supplying a recyclable LOHC to a dehydrogenation reaction zone that is maintained at dehydrogenation reaction conditions, catalytically dehydrogenating the recyclable LOHC in the dehydrogenation reaction zone and recovering gaseous hydrogen and an unloaded aromatic substrate therefrom; combusting an amount of the unloaded aromatic substrate that is less than or equal to the predetermined target blend fraction to provide sufficient thermal energy to maintain the dehydrogenation reaction conditions; recovering the remaining amount of unloaded aromatic substrate for recycle as recycle liquid; and converting at least a portion of the gaseous hydrogen generated by dehydrogenation in an electrochemical conversion device to generate the carbon-neutral electrical energy. The recyclable LOHC supplied to the dehydrogenation reaction zone may contain a predetermined target blend fraction of the hydrogenated carbon neutral component, and at least about 5 weight % carbon-neutral labile hydrogen that is available for removal by catalytic dehydrogenation. The remaining amount of unloaded aromatic substrate may be recycled as a recycle component and catalytically hydrogenated in the preparation of the recyclable LOHC.

In one aspect, the process may be a cyclic process for providing hydrogen for electricity generation and to enable recycle and reuse of liquid components in the cyclic process. Accordingly, the process may further comprise forming an unloaded hydrogen carrier comprising a recycle component and the predetermined target blend fraction, based on the weight of the unloaded hydrogen carrier, of a carbon-neutral component; and adding carbon-neutral hydrogen to the unloaded hydrogen carrier by catalytic hydrogenation to form the recyclable LOHC comprising the hydrogenated recycle component and the hydrogenated carbon-neutral component. The LOHC is then supplied to a catalytic dehydrogenation process to liberate the labile hydrogen from the LOHC. Electrical energy is generated by electrochemical conversion of the liberated hydrogen.

In another aspect, the process may further comprise adding carbon-neutral hydrogen by catalytic hydrogenation to a recycle component to form the hydrogenated recycle component and adding carbon neutral hydrogen by catalytic hydrogenation to a carbon-neutral component to form the hydrogenated carbon-neutral component. The recyclable LOHC is formed by blending the hydrogenated recycle component with the predetermined target blend fraction, based on the weight of the recyclable LOHC, of the hydrogenated carbon neutral component.

In another aspect, the process may include adding hydrogen to the unloaded hydrogen carrier at one stage of the cycle, and reversibly recovering the hydrogen at another stage of the process, the loaded and unloaded recyclable LOHC cycling through the stages with little or no chemical modification of the underlying substrate structure, and with a net zero carbon footprint.

In another aspect, the process may be a cyclic process in which a recyclable LOHC circulates within an energy delivery system that has a net zero carbon footprint, i.e. is carbon neutral. Carbon neutral hydrocarbon components of the recyclable LOHC may be prepared from precursors, such as biomass, that recycle atmospheric CO2. Combustion of these carbon-neutral components balances carbon emissions with carbon removal and is therefore carbon-neutral with respect to the hydrocarbon components. Labile hydrogen that is provided to the process by the LOHC feedstock may be blue or green hydrogen, generated by a process that balances carbon emissions with carbon removal, or that eliminates carbon emissions altogether.

A majority of the recyclable LOHC circulates through the process as the hydrogen carrier. An energy input requirement of the process involves the endothermic nature of the dehydrogenation reaction, which requires input of thermal energy to maintain suitable dehydrogenation reaction conditions. Achieving carbon-neutral combustion for generating the thermal energy may be at least partially achieved by adding a minor amount, termed the target blend fraction, of a hydrogenated carbon-neutral component to the recyclable LOHC. After the recyclable LOHC has been converted to gaseous hydrogen and an unloaded aromatic substrate, a portion of the unloaded aromatic substrate less than or equal to the specified target blend fraction value is combusted to generate thermal energy for maintaining the overall system operation as a carbon-neutral process. At least a portion of the remaining unloaded aromatic substrate may be recycled for preparation of fresh recyclable LOHC.

Carbon-neutral hydrogen provided to the recyclable LOHC by catalytic hydrogenation for subsequent removal and electrochemical conversion is supplied in sufficient quantities to meet the electrical energy needs of the process. Carbon-neutral hydrogen may be classified as green or blue hydrogen. Carbon-neutral hydrogen that is produced by electrolysis of water using renewable energy may be characterized as green hydrogen. Carbon-neutral or carbon-negative hydrogen that is produced by hydrocarbon oxidation with carbon capture and storage (CCS), or by partial oxidation or thermal pyrolysis of biomass, or by hydrocarbon pyrolysis with solid carbon capture, may be characterized as blue hydrogen.

In one aspect, the process is provided to operate as a carbon neutral process using the particular recyclable LOHC. The dehydrogenation reaction zone is maintained at dehydrogenation reaction temperature using carbon-neutral thermal energy generated by combustion in a combustion zone of an amount of unloaded aromatic substrate less than or equal to a target blend fraction amount of the unloaded aromatic substrate. The generated hydrogen from dehydrogenation is purified for use in fuel cells, including PEMFC, SOFC and other technologies using procedures and equipment that are particularly designed to enable carbon-neutral system operation.

GLOSSARY

Figure 1:
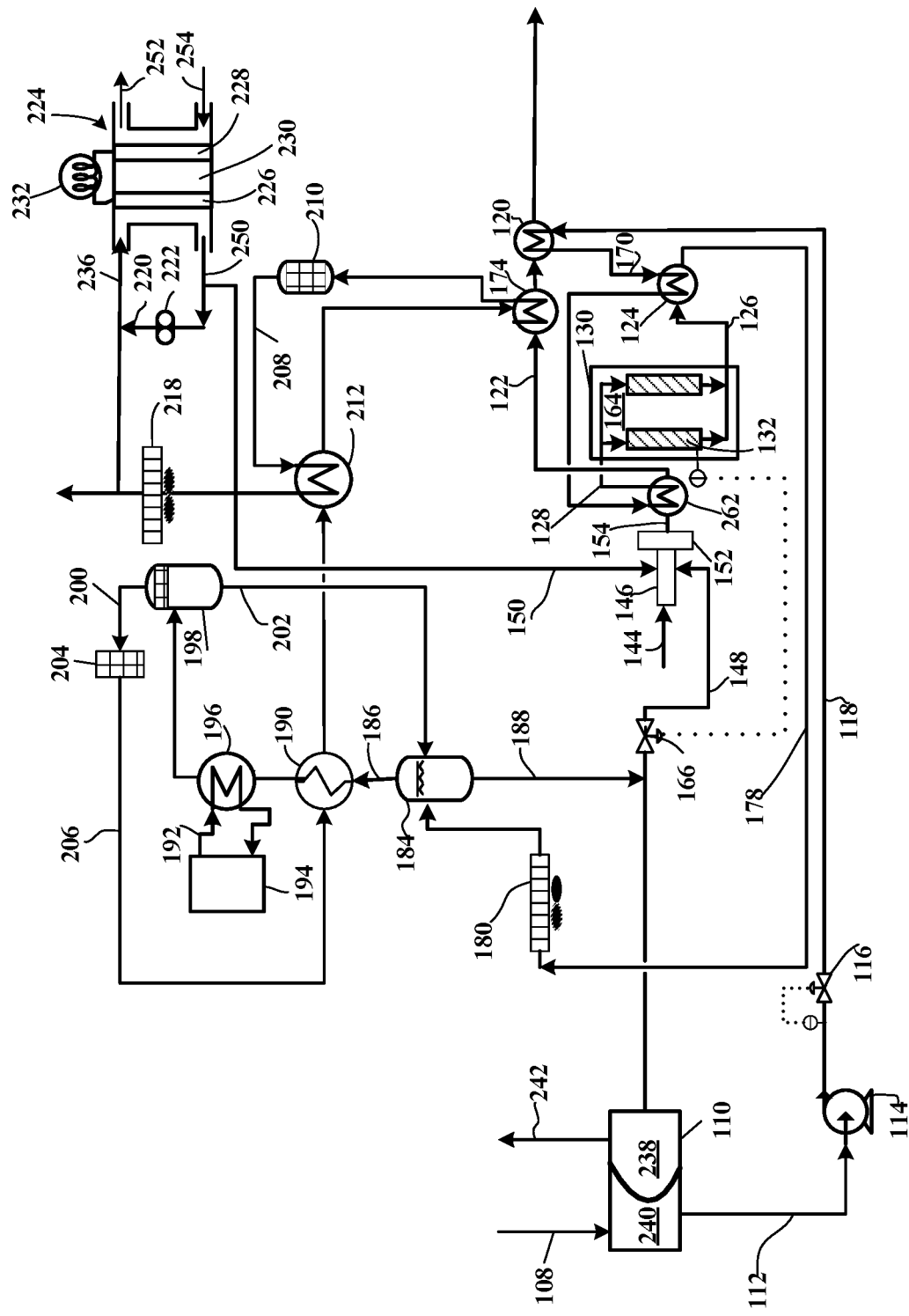
FIG. 1 illustrates a schematic of the process for generating carbon-neutral electricity from a recyclable LOHC feed, according to some embodiments.

As used herein, "liquid organic hydrogen carrier" or "LOHC" refers to an hydrogenated organic substrate selected from monocyclic, polycyclic, heterocyclic and homocyclic organic compounds that can be processed to release chemically bound hydrogen via dehydrogenation and are liquid at standard temperature and pressure (STP, 0° C., 1 bar).

As used herein, the term "R-LOHC" refers to a regenerated or hydrogen-enriched hydrogenated form of the liquid organic hydrogen carrier.

As used herein, the term "S-LOHC" refers to a spent or hydrogen-deficient dehydrogenated form of the liquid organic hydrogen carrier.

As used herein, the term "labile hydrogen" refers to the portion of chemically bound hydrogen in a hydrogenated LOHC that may be reversibly removed by dehydrogenation, and subsequently reversibly replaced by a following hydrogenation reaction.

As used herein, the term "recyclable LOHC" refers to a liquid organic hydrogen carrier that may be, in sequential process steps, dehydrogenated to remove at least a portion of the hydrogen atoms contained in the carrier, and rehydrogenated to replace at least a portion of the removed hydrogen atoms.

As used herein, the term "secondary component" containing carbon-neutral carbon to the LOHC feed in sufficient amount to at least equal the carbon atoms being exhausted during the generation process. The exhausted carbon atoms may include vented hydrocarbons and/or vented carbon oxides. The carbon in the secondary component is termed as "carbon-neutral carbon" by reason of its origin from carbon compounds that are captured from the atmosphere or from flue gas that is being vented to the atmosphere, including $CO_2$.

Unless otherwise indicated, the acronym "CNEF" is intended to refer to carbon-neutral energy facility.

Unless otherwise indicated, the acronym "MCH" is intended to refer to methylcyclohexane.

Unless otherwise indicated, the acronym "BTX" is intended to refer to a mixture of benzene, toluene, and xylene, in any ratio.

Unless otherwise indicated, the acronym "GHG" is intended to refer to a greenhouse gas found in the earth's atmosphere that may absorb and emit radiant energy within the thermal infrared range. Unless otherwise indicated, the term "CN" is intended to refer to "carbon-neutral" compositions, processes and apparatus employing these compositions. The process of generating hydrogen from a blended LOHC feed and of generating electricity from the generated hydrogen is termed as "carbon-neutral" by reason of the purposeful addition of the secondary component containing carbon-neutral carbon to the LOHC feed in sufficient amount to at least equal the number of carbon atoms being exhausted during the electrical generation process, including vented hydrocarbons and vented carbon oxides.

Unless otherwise indicated, the term "carbon-neutral carbon" or "CNC" further includes carbon compounds that are captured from the atmosphere, including carbon oxides, and from combustion processes and from flue gas emissions that would otherwise persist or be released into the atmosphere.

As used herein, the term "wt %" as used here is equivalent to "percent by weight".

As used herein, the term "bi-modal" refers to the ability of the blended LOHC to carry labile hydrogen for release in a dehydrogenation device and the ability for the CN component contained in the LOHC to be combusted without attracting carbon penalties.

The term "unloaded hydrogen carrier" refers to a C6-C8 hydrocarbon having the capacity to capture chemically bound hydrogen in a catalytic hydrogenation process. An unloaded hydrogen carrier may be a single or double ring aromatic, such as benzene, toluene or decalin. In some circumstances, the unloaded hydrogen carrier may further comprise one or more partially hydrogenated carriers such as cyclohexene and cyclohexadiene, or the corresponding partially hydrogenated analogs of toluene and decalin.

DETAILED DESCRIPTION OF EMBODIMENTS

Reference will be made in detail to various embodiments, examples of which are illustrated in the accompanying drawings. In the following detailed description, numerous specific details are set forth to provide a thorough understanding of the present disclosure and the embodiments described herein.

However, embodiments described herein may be practiced without these specific details. In other instances, well-known methods, procedures, components, and mechanical apparatuses have not been described in detail so as not to unnecessarily obscure aspects of the embodiments.

Where permitted, all publications, patents and patent applications cited in this application are herein incorporated by reference in their entirety; to the extent such disclosure is not inconsistent with the modified fuels described herein.

Unless otherwise specified, the recitation of a genus of elements, materials, or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions, and methods of this process.

Reference will be made in detail to various embodiments, examples of which are illustrated in the accompanying drawings. In the following detailed description, numerous specific details are set forth to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

Conventional fossil fuel generated electricity, as well as electricity demand, varies overtime, sometimes daily, or seasonally, or annually. Variations in supply become even more pronounced when the utility produces electricity from renewable sources. Conventional methods of renewable electricity generation are at the mercy of changing solar radiation, wind, and wave patterns.

Accordingly, one embodiment of the present disclosure includes a CN generation system is provided for compensating for the variations in electricity generation and demand by means of generating a highly energetic LOHC material based on chemically bound hydrogen using excess electricity as supplied for electrolysis of water to generate hydrogen which is then chemically bound to the LOHC by catalytic hydrogenation, forming an R-LOHC product which may be exported for external use or stockpiled for use when conditions change and electricity demand outpaces available supply. When the electricity used for electrolysis, whether supplied from a utility grid or supplied by local and/or internal generation, is generated from renewable energy sources, the R-LOHC produced in the system is considered to be carbon-neutral with respect to the labile hydrogen content of the R-LOHC product.

Another embodiment of the present disclosure includes a CN electricity generation system and a corresponding process which provides stockpiled R-LOHC feedstock for a catalytic dehydrogenation process to produce hydrogen as an electrochemical feedstock for generating electricity, thereby balancing electricity shortfalls when present in a conventional generating grid.

A further embodiment of the present disclosure includes a process for balancing electricity production using renewable sources of electricity without the variation of electricity generation when using a natural energy source, such as but not limited to solar, wind, geothermal, hydroelectric, and the like.

A yet further embodiment of the present disclosure includes a process that provides a source of a portable LOHC product that may be used in fuel cell containing machines, vehicles and stationary power modules.

A further embodiment of the present disclosure includes a process that provides for the on-demand generation of carbon-neutral electricity.

Described below are processes and systems that provide carbon-neutral electricity. Reference will be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well known methods, procedures, components, and mechanical apparatuses have not been described in detail so as not to unnecessarily obscure aspects of the embodiments.

A recyclable LOHC is provided for delivering carbon-neutral electricity via labile hydrogen that is chemically stored in the recyclable LOHC. The recyclable LOHC is a hydrogen rich carbonaceous material that is chemically stable and normally liquid at ambient conditions, having a large hydrogen capacity, but without the associated risks that are inherent with high pressure hydrogen gas storage. The labile hydrogen may be reversibly removed from the recyclable LOHC during dehydrogenation without decomposing the underlying aromatic substrate structure of the carrier. Furthermore, the recyclable LOHC provides a reliable and stable source of hydrogen without the net positive $CO_2$ emissions that are generally associated with hydrocarbon combustion to provide the thermal energy for dehydrogenation.

The recyclable LOHC may be a cycloparaffin with a hydrogen storage capacity of at least about 5 weight % labile hydrogen, and in some cases at least about 6 weight % labile hydrogen. The recyclable LOHC may comprise a cyclic saturated hydrocarbon such as cyclohexane, methylcyclohexane and/or decalin; reversible dehydrogenation conversion of the recyclable LOHC produces the corresponding aromatic substrate: benzene, toluene, or naphthalene. The recyclable LOHC may comprise at least about 80 weight % methylcyclohexane (MCH), or at least about 90 weight % MCH, or in a range from 95 to 99.9 weight % MCH. The recyclable LOHC may comprise a blend of a hydrogenated carrier component, such as a hydrogenated recycle component recovered from a hydrogen-to-electricity generation process, from 0.1-25 weight % of a hydrogenated carbon-neutral component that is prepared from carbon-neutral precursors, and at least about 5 weight % added carbon-neutral hydrogen that is available for removal in a reversible dehydrogenation reaction.

The recyclable LOHC may be produced for use in the process by blending a recycle component and a predetermined target blend fraction, based on the weight of the blend, of a carbon-neutral component; and adding at least about 5 weight % carbon-neutral hydrogen to the unloaded hydrogen carrier by catalytic hydrogenation to form the recyclable LOHC.

Alternatively, the recyclable LOHC may be produced by combining a hydrogenated recycle component and a predetermined target blend fraction, based on the weight of the recyclable LOHC, of a hydrogenated carbon-neutral component, the recyclable LOHC also containing at least about 5 weight % carbon-neutral hydrogen.

The recycle component may be an aromatic substrate material comprising one or a combination of aromatic substrates, such as benzene, toluene, and/or naphthalene, that may be combined with the carbon-neutral component and the combination catalytically hydrogenated to form the recyclable LOHC. Alternatively, the recycle component may be hydrogenated prior to blending with a hydrogenated carbon-neutral component to form the recyclable LOHC.

At least a portion of the recycle component may be recovered from a hydrogen to electricity generation process, in which hydrogen is delivered as chemically bound hydrogen, liberated by dehydrogenation, and an unloaded aromatic substrate byproduct from dehydrogenation recovered as at least a portion of the recycle component. The recycle component may also contain relatively minor amounts of dehydrogenation reaction byproducts, including incompletely dehydrogenated hydrogen carrier and single and multi-ring aromatics. The recycle component may include toluene as the unloaded aromatic substrate, and non-toluene dehydrogenation byproducts, such as MCH, partially dehydrogenated MCH, xylene, and multi-ring aromatics. The recycle component may contain at least 50 weight % toluene; in some instances, at least 75 weight % toluene; in some instances, at least 93 weight % toluene. At least 10 weight % of the recycle component may be recovered from a hydrogen-to-electricity generation process.

As the recycle component is included in the recyclable LOHC as a source of hydrogen only, a make-up component from a conventional source may be included in the recycle component to make up for shortfall in available supply. The recycle component may comprise up to 100 weight % make-up component, though as use of the present process progresses, progressively more of the recycle component will be recovered from a hydrogen-to-electricity process, such that at least 20 weight %, or at least 50 weight %, or at least 70 weight %, or at least 90 weight % of the recycle component will be recovered from a hydrogen-to-electricity process. The make-up component may comprise at least 50 weight % toluene, or at least 70 weight %, or at least 90 weight % toluene, or at least 95 weight % toluene, up to and including 100 weight % toluene.

A carbon neutral component is included as an additive in the unloaded hydrogen carrier for maintaining carbon neutral operation of the process. The carbon-neutral component is produced from molecular precursors either that are produced with no CO2 generation, that are produced with recycled atmospheric CO2, or that are produced with CO2 capture and ultimate storage generated during their production, any of which do not result in a net increase in atmospheric CO2

In one embodiment, the carbon-neutral carrier contained in the recyclable LOHC is produced from biomass. Biomass from plant or animal sources can be purposely grown energy crops, wood or forest residues, waste from food crops, horticultural waste, or food processing residues. Production of carbon-neutral carrier from biomass generally involves one or more biomass conversion steps, such as pyrolysis, gasification, anaerobic digestion, or fermentation. Typical reaction products from these processing methods include one or more of methanol, ethanol, methane, acetic acid, lactic acid, and syngas. One or more of these biomass conversion products may be used to generate an aromatic precursor of the carbon neutral carrier.

As carbon contained in the carbon-neutral component is itself carbon neutral, it is classified as a renewable energy source, and therefore available as a combustion source for the process. Therefore, for purposes of this disclosure, CO2 generated from combustion of the carbon-neutral component or its hydrogenated carbon-neutral carrier analog is termed "green CO2" to indicate that the generated CO2 has been recycled from the atmosphere, and does not contribute to a net increase in atmospheric CO2. Likewise, the process of using the recyclable LOHC for generating electricity is carbon neutral.

The unloaded hydrogen carrier may comprise the recycle component, the predetermined target blend fraction, based on the weight of the unloaded hydrogen carrier, of the carbon-neutral component, and at least about 5 weight % chemically bound carbon-neutral hydrogen as labile hydrogen.

The unloaded hydrogen carrier may comprise at least 20 weight % of the recycle component.

Generally, the unloaded hydrogen carrier comprises at least 0.1 weight % carbon neutral component; in some instances, in a range from 0.1-25 weight % carbon-neutral component; in some instances, in a range from 0.5-15 weight % carbon-neutral component; in some instances, in a range from 0.5-6 weight % carb neutral component. As used herein, the proportion of the carbon-neutral component in the unloaded hydrogen carrier, based on the total unloaded hydrogen carrier, is termed the "target blend fraction".

The recycle component of the unloaded hydrogen carrier may include contaminants, such as byproducts from the dehydrogenation reaction, that are usefully reduced in concentration or removed from the unloaded hydrogen carrier prior to or during hydrogenation. Purification of the unloaded hydrogen carrier by removal or conversion of the contaminants, may include process steps such as hydrogenation, distillation, liquid-liquid separation, crystallization, absorption onto a solid absorbent, and the like.

The recyclable LOHC that is to be delivered for generating electricity may be prepared by catalytic hydrogenation of one or more toluene-based precursors. A carbon-neutral toluene prepared from carbon-neutral precursors may be included. A recycle liquid from a hydrogen-to-electricity process, comprising toluene, may be included. One or more of the toluene-based precursors may be catalytically hydrogenated individually to contain at least about 5 weight % labile hydrogen, and the hydrogenated MCH products blended to form the recyclable LOHC. One or more of the toluene-based precursors may be blended to form an unloaded hydrogen carrier, that then may be catalytically hydrogenated to form the recyclable LOHC. In effect, the recyclable LOHC may be prepared by any combination of blending steps and catalytic hydrogenation steps to prepare the recyclable LOHC.

The catalytic hydrogenation step includes passing the hydrogenation zone feedstocks in liquid or vapor phase over a suitable hydrogenation catalyst that is maintained at a temperature in a range of 200° to 300° C. and at a positive pressure of up to 20 bar. The hydrogenation catalyst may be powdered or in extrudate form. In one aspect, the catalyst may comprise a metal, such as nickel, cobalt, or a mixture thereof. The metal mixture may further be compounded with molybdenum. In another aspect, the hydrogenation catalyst may comprise palladium, platinum, or a mixture thereof. The metal composition may be supported on an oxide material comprising, for example, alumina, silica, titania, or a mixture thereof in any ratio. An additional component or alternative support may include an acidic zeolite with 10 or 12 angstrom ring openings such as faujasite, Beta zeolite or ZSM-5. The hydrogenation catalyst composition may be sulfided prior to use. The hydrogenation reaction may be conducted in an existing refinery having suitable catalyst reaction and support facilities to produce the recyclable LOHC with a purity suitable for use in the present process.

The recyclable LOHC and the process for using the recyclable LOHC as a hydrogen source for carbon-neutral electricity generation is carbon-neutral with respect to the carbon and CO2 emissions, by reason of the carbon-neutral portion of the recyclable LOHC formulation. The recyclable LOHC is also carbon-neutral with respect to the hydrogen gas generated by the carrier by reason of the source of the stored hydrogen. The carbon-neutral hydrogen source for the hydrogenation step is produced by methods that either produce no CO2 or that recycle atmospheric CO2. Green hydrogen is carbon-neutral hydrogen that may be produced by electrolysis of water using renewable energy such as wind, solar, hydroelectric, or geothermal energy sources. Blue hydrogen is carbon-neutral or carbon-negative hydrogen that may be produced by hydrocarbon oxidation with carbon capture and storage (CCS), or by partial oxidation or thermal pyrolysis of biomass, or by hydrocarbon pyrolysis with solid carbon capture. Carbon dioxide sequestration is an exemplary CCS process.

Recyclable LOHC is converted in an endothermic dehydrogenation process to liberate labile hydrogen from the carrier and to produce an unloaded aromatic substrate. A portion of unloaded aromatic substrate may be employed as combustion fuel for preheating the dehydrogenation reaction zone feed, for maintaining the dehydrogenation reaction zone temperature, and for supplying other thermal needs. Additional thermal energy may be required for other aspects of operation. In the case of terrestrial vehicles such as trucks, this additional thermal energy may be needed for traveling in mountainous regions or against a significant headwind. In the case of water vehicles, this additional thermal energy may be needed during storms at sea. In the case of aircraft, this additional thermal energy may be needed for ascending to cruising altitude or when encountering significant headwind conditions.

For maintaining carbon neutral operation, the relative amount of unloaded aromatic substrate that is available for combustion is less than or equal to the relative amount of hydrogenated carbon-neutral component in the recyclable LOHC feed. Accordingly, a target blend fraction is defined as the weight % of hydrogenated carbon neutral component that is present in the recyclable LOHC. The target blend fraction may be in a range from 0.1-25 weight %; in another aspect, from 0.5-15 weight %, in another aspect, from 1-6 weight %. The target blend fraction is also the fractional amount of carbon-neutral component blended in the unloaded hydrogen carrier prior to hydrogenation to form the recyclable LOHC. The target blend fraction may be established in one of several ways. For example, the target blend fraction may be an industry-wide standard for all LOHC blends. Alternatively, the target blend fraction may be a characteristic property of fuels designated by vehicle type, with fuels specifically tailored for one or more of cars, trucks, boats, ships, buses, trains, and aircraft. Alternatively, the recyclable LOHC may be formulated with a target blend fraction of carbon neutral LOHC for a specific vehicle or even a specific journey, using a blending or service facility that supplies fuel to the vehicle.

It will be apparent that the target blend fraction specification may vary from vehicle to vehicle, and from journey to journey. Accordingly, the composition of an MCH enriched recyclable LOHC may be selected for a particular journey or for a particular vehicle. In another embodiment, the target blend fraction of the MCH enriched recyclable LOHC may be determined as a regional or a corporate-wide average. An objective for establishing a target blend fraction of carbon-neutral fuel components in the MCH enriched recyclable LOHC is to significantly reduce or eliminate the $CO_2$ emissions from hybrid hydrogen-electric vehicles. Establishing the target blend fraction allows the industry to specify an amount of carbon-neutral fuel components for carbon-neutral vehicle operation while meeting supply and price limitations.

The recyclable LOHC is suitable for use as a source of hydrogen for a vehicle having transmission capability to communicate the particular power module characteristics with service facilities. At least in part, the communication includes information to establish the target blend fraction requirement of the LOHC feed for the particular module, based on specific characteristics of the dehydrogenation reaction zone and other thermal needs of the module. The service facility providing the recyclable LOHC then blends an amount of hydrogenated carbon-neutral component into the majority hydrogenated recycle component to form a tailored fuel specific for the needs of the particular module, to ensure carbon-neutral operation of the module.

A power module of the invention supplies the electrical energy used by mobile or stationary devices. The power module comprises a first storage vessel for containing the recyclable LOHC prior to dehydrogenation, a second storage vessel for containing the unloaded aromatic substrate product from dehydrogenation, a dehydrogenation reaction zone for generating hydrogen from recyclable LOHC, a hydrogen purification capability for preparing the hydrogen for electrochemical conversion and electricity generation, a separation unit for separating unloaded aromatic substrate from dehydrogenation into a recycle liquid and a combustion liquid, and a combustion zone for combusting the combustion liquid to produce thermal energy for maintaining the dehydrogenation reaction zone at reaction conditions.

The power module includes two on-board liquid storage vessels, a first storage vessel for containing the recyclable LOHC as delivered to the vehicle and a second storage vessel for containing the recycle liquid recovered from dehydrogenation. The recyclable LOHC and the spent recycle liquid are low vapor pressure liquids that may be stored in vessels that would be suitable for gasoline, diesel fuel, aviation fuel and jet fuel storage. In one embodiment, the first and the second storage vessels are located separately in the vehicle. In another embodiment, the two storage vessels are combined into a single vessel, separated into two volumes within the storage vessel by a flexible bladder. As recyclable LOHC is supplied to the vehicle and the recycle liquid is removed, the relative size of the first volume containing the recyclable LOHC increases and that of the second volume containing the recycle liquid decreases. Likewise, as recyclable LOHC is consumed and the recycle liquid produced during vehicle operation, the capacity of the second volume containing the recycle liquid increases relative to that of the first volume containing the recyclable LOHC. A dual nozzle dispenses recyclable LOHC to the vehicle and at the same time extracts spent liquid fuel from the vehicle.

Producing purified hydrogen for electrochemical conversion generally involves condensing the normally liquid components of the dehydrogenated product, separating a gaseous hydrogen phase from the unloaded aromatic substrate phase, using one or a combination of liquid condensation, membrane separation, or filtration. One or more stages of separation may be used. In at least one of the stages, a refrigeration cycle may be included to facilitate separation of the remaining normally liquid components from the gaseous hydrogen product. The hydrogen may be cooled to a sub-ambient temperature of 0° C. or lower, or 10° C. or lower, or 20° C. or lower or 25° C. or lower. In addition to cooling, membrane separation or carbon filtration may be used in either the first cooling stage, the second cooling stage, or in both. The stages of purification are configured to produce a purified hydrogen stream with a purity of at least 99%, in some cases at least 99.96%.

A combustion chamber may be provided for burning the combustion liquid in the presence of preheated air to produce thermal energy as needed. The combustion chamber may be included in a forced air furnace, or in a gas turbine. Heated combustion exhaust gases from the combustion chamber may be used for maintaining the dehydrogenation reaction zone at dehydrogenation conditions and/or for preheating the recyclable LOHC prior to reaction. Preheating the recyclable LOHC may include vaporizing at least a portion of the dehydrogenation reaction zone feed. Preheating the recyclable LOHC may involve heat exchanging the heated exhaust gases with the LOHC prior to the reaction zone, using, for example, one or more of a shell and tube or a plate heat exchanger. Supplying heat to maintain the reaction zone temperature may involve passing heated exhaust gases through the reaction zone and around the catalyst-containing reactor tubes. Supplying heat for reaction may include using the exhaust gases to heat a circulating heat transfer fluid for conveying heat for reaction zone feed preheat or for reaction zone temperature control.

A fuel cell electrochemical device is provided on the vehicle for converting on-board generated carbon-neutral hydrogen to electrical power. The fuel cell device generates electricity by conversion of chemical energy of the hydrogen fuel and air into electricity through a pair of redox reactions. A suitable fuel cell for use in the vehicle is selected from an alkaline fuel cell (AFC), a Proton-Exchange Membrane Fuel Cell (PEMFC), a phosphoric acid fuel cell (PAFC), a molten carbonate fuel cell (MCFC) and an oxide ceramic or solid oxide fuel cell (SOFC). All may be operated with atmospheric oxygen from the environment as an oxidizer gas, with the result that no storage of the oxidizer gas is required. The fuel cell system may comprise one or more fuel cell units. In one embodiment, the fuel cell system comprises one or more Proton-Exchange Membrane Fuel Cells.

The electrochemical conversion device for converting carbon-neutral hydrogen to electrical power may include a solid oxide fuel cell (SOFC) device operating in a temperature range 500°–650° C. Approximately 30-35% of the energy generated in the SOFC is thermal energy that is suitable for at least partially maintaining the dehydrogenation reaction zone temperature. Gases exhausted from the anode side of the SOFC system include unreacted hydrogen and a small amount of unloaded aromatic substrate, such as toluene, that was carried with hydrogen feed to the SOFC from dehydrogenation. Gases exhausted from the cathode side of the SOFC system, including oxygen depleted air and water vapor, are combined with the anode exhaust stream in a catalytic conversion unit, which produces water, oxygen depleted air and $CO_2$ from aromatic liquid oxidation. A recyclable LOHC feed for use with the SOFC device may be preselected to contain a target blend fraction in a range of 0.1-6 weight % of hydrogenated carbon-neutral component in order to maintain the overall carbon-neutral process.

The electrochemical conversion device for converting carbon-neutral hydrogen to electrical power may include a Proton-Exchange Membrane Fuel Cells (PEMFC) operating in a temperature range 50°–100° C. Only a small portion, is any, of the heat generated by a PEMFC may be available for use with the dehydrogenation reaction zone. The remaining heat for dehydrogenation with a PEMFC device is provided by combustion of a portion of the combustion liquid, the portion being specified by the target blend fraction. In this case, the target blend fraction may be in a range of 0.1-25 weight %; in another aspect, 0.5-15 weight %; and in another aspect, 1-10 weight %.

The dehydrogenation reaction process removes at least a portion of the labile hydrogen from the recyclable LOHC and yields an aromatic substrate while minimizing decomposition of the carbonaceous backbone substrate structure. At least 80 weight %, and in another aspect at least 90 weight %, and in another aspect at least 95 weight % of the labile hydrogen contained in the recyclable LOHC may be recovered as gaseous hydrogen following catalytic dehydrogenation.

The dehydrogenation reaction zone may be a fixed bed, multi-tube reactor, with each of a plurality of reaction tubes filled with particulate dehydrogenation catalyst The reaction tubes may be in contact on an external surface with heated combustion exhaust gases, or submerged in Heat Transfer Fluid (HTF) for temperature control. The reactor tubes may be configured for parallel flow, with each reactor tube configured to receive a portion of the reaction zone feed. Bundles of parallel flow reactor tubes may further be configured as staged reactor bundles, each stage after the first receiving partially converted products from the preceding stage of reactor tubes with respect to reactant flow, and subsequently passing additionally converted products to any subsequent stage. The recyclable LOHC may be supplied to the reaction zone as a single preheated, vapor phase stream, or as multiple streams, each of which may be supplied at the same, or in some cases differing, temperatures. Alternatively, the dehydrogenation reaction zone may be a single catalyst containing vessel through which the recyclable LOHC is passed for conversion to hydrogen and an unloaded aromatic substrate depleted in labile hydrogen.

Dehydrogenation reaction conditions may include an average catalyst temperature in the range of 250° C. and 600° C., or in a range of 350° C. and 600° C. and a total pressure in the range of 1-5 Barg. Thermal energy needed to maintain the reaction zone temperature and to overcome the endotherm of the dehydrogenation reaction is generated within the power module. Sources of thermal energy include one or more of an on-board combustion chamber, thermal energy generated during operation of the electrochemical conversion device, or electrical energy. In one embodiment, the recyclable LOHC is supplied to the reaction zone at the desired average reaction zone temperature in the range of 250° C. and 400° C. Alternatively, the recyclable LOHC is preheated to a temperature above the target temperature to compensate for the normal cooling effect of the endothermic reaction in the reaction zone, while minimizing coke formation at the initially higher temperature in the reaction zone. In this regard, an inlet temperature of up to 600° C. may be employed.

The dehydrogenation reaction zone may also be contained within a reactor shell. Heated transfer fluids (HTF) from combustion or ohmic sources may then be supplied to the shell side of the zone to maintain the catalyst temperature within the catalyst containing tubes contained therein. The catalyst containing tubes may also be heated by electrical energy. Additional heated hydrogen may also be included with the recyclable LOHC, to reduce the amount of coking at the reactor inlet.

The dehydrogenation catalyst generally comprises an active metal on an oxide support. Suitable active metals include, for example, nickel, platinum, palladium, rhodium, iridium, and ruthenium. The oxide support is a highly porous gamma alumina, silica, magnesia, or silica-alumina support having a surface area of greater than 150 m2/g. In one embodiment, the catalyst is a particulate solid, comprising particulates in the form of irregular shaped particulates, powder particulates, cylindrical particulates, or spherical particulates, and having a diameter ranging from 0.1 mm to 5 mm. In one embodiment, reactor tubes through which the reacting fluid flows are coated on the inside surface of the tubes with a coating of a catalytic material.

The normally liquid product (i.e. liquid phase at ambient temperature and pressure) from dehydrogenation, termed the unloaded aromatic substrate, may include partially or fully dehydrogenated aromatic substrate of the recyclable LOHC. A recyclable LOHC comprising MCH may generate a toluene-enriched unloaded aromatic substrate as well as unreacted MCH, condensation compounds of MCH and reaction fragments from destructive decomposition of MCH. The fully dehydrogenated aromatic substrate is generally the predominant product in the unloaded aromatic substrate. The unloaded aromatic substrate from MCH dehydrogenation may comprise at least 60 weight % toluene; or at least 80 weight % toluene; or at least 95 weight % toluene, the remainder of the unloaded aromatic substrate being non-toluene dehydrogenation reaction byproducts, such as MCH, partially dehydrogenated MCH, mixed xylenes, and multi-ring aromatics.

The unloaded aromatic substrate may be separated into two portions: a recycle liquid is passed to on-board storage for eventual removal from the module; and a combustion liquid is passed to a combustion chamber for generating the thermal energy used in the power module. The fraction of the unloaded aromatic substrate that is recovered as combustion liquid may be set at or below the target blend fraction of the LOHC blend, thus maintaining carbon neutral operation of the power module. In one embodiment, the recycle liquid is withdrawn from the module for use as the recycle component of the unloaded hydrogen carrier.

A "smart delivery pump" which communicates with the receiving entity adjusts the carbon-neutral target blend fraction of the LOHC blend thus maintaining carbon-neutral operation of the power module.

Process Steps and Cyclic Process

Embodiments of the disclosed processes herein include methods employing cyclic processes and apparatus configured and controlled to complement and balance electricity available from the electricity supply grid. The grid electricity is preferentially supplied, at least in part, by renewable sources such as, for example, wind, solar, geothermal, and hydroelectric sources. Electrical outputs derived from these renewable sources tend to vary quite substantially in availability over the course of a single day, week, month, season and year. The disclosed embodiments of processes and corresponding systems for carrying out the inventive processes described hereinbelow serve to store electrical energy in the form of a high energy LOHC product during periods of high electricity generation, and to enable recovering of the electrical energy from the LOHC product during periods of reduced electricity generation, or when disconnected from the electricity supply grid.

During periods of high electricity generation, a portion of the electricity from the supply grid may be supplied to an electrolysis unit for electrolyzing water into hydrogen and oxygen as described in the various embodiments of the disclosure presented below.

Electrochemical decomposition of water into oxygen and hydrogen gas by a process called electrolysis has been known since the 18$^{th}$ century. In conventional electrolysis, a direct current ("DC") electrical power source is connected to two electrodes which are placed in the water. A number of metal electrodes are known, including, but not limited to platinum, iridium, nickel, or iron, that may be suitably employed. To increase the conductivity of the water, one more salts, such as for example, but not limited to sodium or lithium salts, may be added to the water prior to an electrolysis step. Hydrogen gas will be generated at the cathode and oxygen gas at the anode, both of which may be collected and stored for use in further processing steps, or for other purposes.

Electrolyzer cells that are suitable for the process include a PEMEC (proton exchange membrane electrolyzer Cells), a (SOEC) solid oxide electrolyzer cells, and the like capable of performing an efficient electrolysis step.

A PEMEC uses a solid polymer electrolyte to conduct protons from the anode to the cathode while insulating the electrodes electrically. Suitable PEMED electrolysis systems are described and well known in the art.

A solid oxide electrolyzer cell (SOEC) is a solid oxide fuel cell that runs in regenerative mode to achieve the electrolysis of water by using for example, but not limited to a solid oxide, or ceramic electrolyte. The electrolysis reaction proceeds with the oxidation of water occurring at the anode and reduction of water occurring at the cathode to produce hydrogen gas and oxygen. Solid oxide electrolyzer cells typically operate at temperatures between 400° and 850° C. Suitable SOEC electrolysis systems are well known in the art.

In one embodiment, the hydrogen gas recovered from an electrolysis step may be conditioned by, for example, adjusting the temperature, pressure or purity of the hydrogen gas to render it suitable as a reactant for the hydrogenation of an hydrogen-deficient or "spent" S-LOHC process material or recyclable LOHC product, In additional embodiments of the present disclosure, the oxygen gas byproduct from an electrolysis process may be exported for external use, or used further in local processes. For example, in a refinery setting, the oxygen may be directed to one or more combustion units to aid combustion processes to generate heat. A second example embodiment is the use of oxygen-enriched air for combustion, which may be suitable employed to reduce the NOx emissions in the combustion gases, and to increase the overall combustion efficiency.

One embodiment of the present disclosure is a process for supplementing the generation of electricity from one or more renewable resources, comprising the steps of (a) preparing a hydrogen enriched liquid organic hydrogen carrier (R-LOHC) by means of a hydrogenation reaction using a first hydrogen depleted liquid organic hydrogen carrier (S-LOHC) and a first source of gaseous hydrogen within a hydrogenation reaction zone; wherein a first source of gaseous hydrogen is produced by electrolysis of an aqueous fluid using an electrolysis cell powered by a first source of electricity; wherein a first source of electricity is sourced from at least one renewable resource; wherein the R-LOHC is optionally stored within an R-LOHC storage vessel; then (b) generating a second supply of electricity by means of an electrochemical conversion of a second source of gaseous hydrogen within a fuel cell; wherein a second source of a gaseous hydrogen is produced by means of a second dehydrogenation reaction using the R-LOHC in a dehydrogenation reaction zone; and then (c) obtaining a second S-LOHC from a dehydrogenation reaction zone after a second dehydrogenation reaction; wherein the first S-LOHC is optionally stored within a first S-LOHC storage vessel; and wherein the second S-LOHC is optionally stored within either a first S-LOHC storage vessel or a second S-LOHC storage vessel; and wherein the renewable sources of electricity are selected from wind power, solar electricity, geothermal energy, hydroelectric electricity and combinations thereof.

A further embodiment of the present disclosure employs performing the hereinabove immediately disclosed process steps (a), (b) and (c) repeated in a cyclic step-wise order in the corresponding alphabetical sequence of a, b, c, a, b, c, . . . and so forth, as desired, until the process is paused, and optionally restarted at any process step.

Another embodiment of the present disclosure is a process further employing a second source of gaseous hydrogen may include an excess portion of a first source of gaseous hydrogen not used in a first hydrogenation reaction; and wherein a second source of gaseous hydrogen may include an excess portion of a first source of gaseous hydrogen.

One embodiment of the present disclosure includes additional steps for preparing a regenerated R-LOHC comprising supplying a first source of electricity generated from a renewable resource to an electrolysis cell using an aqueous fluid; generating a second gaseous hydrogen source and a second oxygen byproduct from the electrolysis cell; supplying a second S-LOHC to a hydrogenation reaction zone; hydrogenating a second S-LOHC with at least a portion of the second gaseous hydrogen source; and then producing a regenerated R-LOHC within a hydrogenation reaction zone; wherein the regenerated R-LOHC is optionally stored within an R-LOHC storage vessel.

One embodiment of the present disclosure includes additional steps for generating a second supply of electricity comprising converting at least a portion of a regenerated R-LOHC in a dehydrogenation reaction zone by means of a dehydrogenation reaction and recovering a third gaseous hydrogen and an third S-LOHC byproduct therefrom; then electrochemically converting at least a portion of a third gaseous hydrogen in a fuel cell and generating a second supply of electricity therefrom; and then optionally, storing at least a portion of the third S-LOHC byproduct in an S-LOHC storage vessel.

Another embodiment of the present disclosure includes additional steps for generating a second supply of electricity comprising supplying an R-LOHC from an R-LOHC storage vessel to a dehydrogenation reaction zone; then converting at least a portion of a R-LOHC in a dehydrogenation reaction zone and recovering a third gaseous hydrogen and a third S-LOHC byproduct therefrom; then electrochemically converting at least a portion of the third gaseous hydrogen in a fuel cell and generating a second supply of electricity therefrom; and then optionally, storing at least a portion of a third S-LOHC byproduct in an S-LOHC storage vessel.

A further embodiment of the present disclosure includes an R-LOHC material containing from 5 to 10 wt % of a secondary component; wherein the secondary component is a carbon-neutral hydrocarbon as defined herein.

One embodiment of the present disclosure includes the additional steps of producing a blended LOHC feed consisting of a primary component having a cyclic chemical structure and containing greater than 5 wt % labile hydrogen, and a secondary component having a chemical structure and containing greater than 5 wt % labile hydrogen; wherein a secondary component comprises carbon that is sourced from a carbon-neutral source; and converting at least a portion of a blended LOHC feed in a dehydrogenation reaction zone by means of a dehydrogenation reaction to a produce a regenerated R-LOHC.

A further embodiment of the present disclosure includes the additional steps of combusting a portion of an S-LOHC byproduct in a combustor; then supplying at least a portion of the heat generated by a combustor for maintaining the dehydrogenation reaction zone temperature within a dehydrogenation reaction zone; and then generating an exhaust stream containing gaseous carbon compounds from a combustor.

In a related embodiment, the source of R-LOHC that is converted by any dehydrogenation reaction contains sufficient carbon-neutral carbon content to balance the amount of carbon emitted as gaseous carbon compounds from a combustor.

Another embodiment of the present disclosure includes a method for generating carbon-neutral electrical energy using hydrogen as the energy source, comprising supplying a recyclable LOHC to a dehydrogenation reaction zone that is maintained at dehydrogenation reaction conditions, the recyclable LOHC comprising a hydrogenated recycle component, a predetermined target blend fraction of a hydrogenated carbon neutral component, and at least about 5 weight % carbon-neutral labile hydrogen that is available for removal by catalytic dehydrogenation; catalytically dehydrogenating the recyclable LOHC in the dehydrogenation reaction zone and recovering gaseous hydrogen and an unloaded aromatic substrate therefrom; combusting an amount of the unloaded aromatic substrate that is less than or equal to the predetermined target blend fraction to provide sufficient thermal energy to maintain the dehydrogenation reaction conditions; recovering the remaining amount of unloaded aromatic substrate; and converting at least a portion of the gaseous hydrogen generated by dehydrogenation in an electrochemical conversion device to generate the carbon-neutral electrical energy.

One embodiment of the present disclosure includes the additional step of forming an unloaded hydrogen carrier comprising a recycle component and the predetermined target blend fraction, based on the weight of the unloaded hydrogen carrier, of a carbon-neutral component; and adding carbon-neutral hydrogen to the unloaded hydrogen carrier by catalytic hydrogenation to form the recyclable LOHC comprising the hydrogenated recycle component and the hydrogenated carbon-neutral component; wherein the unloaded hydrogen carrier being characterized by a labile hydrogen content of at least about 5 weight %.

A further embodiment of the present disclosure includes the additional step of adding carbon-neutral hydrogen by catalytic hydrogenation to a recycle component to form the hydrogenated recycle component; then adding carbon-neutral hydrogen by catalytic hydrogenation to a carbon-neutral component to form the hydrogenated carbon-neutral component; and then blending the hydrogenated recycle component with the predetermined target blend fraction, based on the weight of the recyclable LOHC, of the hydrogenated carbon-neutral component, to form the recyclable LOHC.

A further related embodiment of the present disclosure includes a further step comprising recycling at least a portion of the remaining amount of unloaded aromatic substrate as the recycle component to the recyclable LOHC; wherein at least a portion of the recycle component is recovered from a hydrogen-to-electricity generation process or alternatively wherein at least 10 weight % of the recycle component is recovered from a hydrogen-to-electricity generation process, or yet alternatively wherein the recycle component recovered from a hydrogen-to-electricity generation process comprises at least 50 weight % toluene, or yet alternatively wherein the hydrogenated carbon-neutral component is prepared from at least one carbon-neutral precursor, or yet alternatively wherein the carbon-neutral precursor is ethanol produced by fermentation of biomass, the ethanol being catalytically cyclized to form the carbon-neutral component, or yet alternatively wherein the carbon-neutral precursor is methanol produced from biomass, municipal solid waste, biogas, or recovered CO2 from the atmosphere, or yet alternatively wherein the carbon-neutral component comprises at least 90 weight % carbon-neutral toluene.

One embodiment of the present disclosure includes the use of carbon-neutral hydrogen that is green hydrogen, generated by electrolysis of water using electrical energy that was generated from wind, solar, hydroelectric, or geothermal energy, or wherein the carbon-neutral hydrogen is blue hydrogen produced by hydrocarbon oxidation with carbon capture and storage (CCS), or by partial oxidation or thermal pyrolysis of biomass, or by hydrocarbon pyrolysis with solid carbon capture.

Another embodiment of the present disclosure includes methods and processes wherein the recyclable LOHC comprises at least 90 weight % MCH and wherein the target blend fraction is in a range of 0.1-25 weight %

A further embodiment of the present disclosure includes the methods and processes wherein the unloaded hydrogen carrier comprises at least 20 weight % of the recycle component and at least 90 weight % toluene.

One embodiment of the present disclosure includes the additional methods and processes wherein the unloaded aromatic substrate recovered from the dehydrogenation reaction zone for recycle as the recycle component comprises toluene and dehydrogenation byproduct contaminants, or alternatively wherein the recycle component comprises at least about 70 weight % toluene and less than about 30 weight % dehydrogenation byproduct contaminants selected from one or more of MCH, partially dehydrogenated MCH, xylene, and multi-ring aromatics.

An additional embodiment of the present disclosure includes methods and processes further comprising removing at least a portion of the dehydrogenation byproduct contaminants from the recycle component prior to or during the catalytic hydrogenation step.

The method of claim 12, wherein the recyclable LOHC contains sufficient hydrogenated carbon-neutral component to convert at least 80 weight % of the labile hydrogen contained in the recyclable LOHC to gaseous hydrogen during catalytic dehydrogenation of the recyclable LOHC.

Another embodiment of the present disclosure includes methods and processes wherein the dehydrogenation reaction conditions include a dehydrogenation temperature in a range of 350° C. and 600° C.

One embodiment of the present disclosure includes methods and processes wherein the gaseous hydrogen and the unloaded liquid substrate are generated in the dehydrogenation process, and wherein from 0.1-25 weight % of the unloaded liquid substrate is available for combustion to maintain the dehydrogenation process at carbon neutral operating conditions.

A further embodiment of the present disclosure includes methods and processes further comprising combusting up to the target blend fraction of the unloaded liquid substrate in air to generate thermal energy for vaporizing and heating the recyclable LOHC to the dehydrogenation temperature and for maintaining the dehydrogenation temperature of the dehydrogenation reaction zone.

One embodiment of the present disclosure includes methods and processes further comprising purifying the gaseous hydrogen recovered from the dehydrogenation reaction zone, prior to the step of converting at least a portion of the gaseous hydrogen in the electrochemical conversion device.

Another embodiment of the present disclosure includes methods and processes wherein the gaseous hydrogen recovered from the dehydrogenation reaction zone is chilled by refrigeration prior to passing the hydrogen to a PEM electrochemical conversion device, and alternatively wherein the gaseous hydrogen is cooled by refrigeration to −10° C. or lower to liquefy contaminants remaining in the gaseous hydrogen and to isolate purified gaseous hydrogen having a purity of at least 99.9 weight %, for passing to the electrochemical conversion device, and yet alternatively wherein the gaseous hydrogen is further purified by use of a membrane capable of separating gaseous hydrogen from vapor phase toluene.

Yet another embodiment of the present disclosure includes methods and processes wherein the electrochemical conversion device is an PEMFC and the target blend fraction is in a range from 1-10 weight %, or alternatively wherein the electrochemical conversion device is a SOFC and the target blend fraction is in a range from 0.5-5 weight %.

Hydrogenation

In further embodiments, at least a portion of the hydrogen gas recovered from an electrolysis step, optionally followed by a conditioning step, may be supplied to a hydrogenation reactor for chemically incorporating the hydrogen into a hydrogen-deficient liquid organic carrier (S-LOHC). Accordingly, hydrogen storage achieved in this way involves the production of a resulting hydrogen-rich carbonaceous material that is chemically stable and normally liquid at ambient conditions, having a large hydrogen capacity, but without the associated risks that are inherent with high-pressure hydrogen gas storage. In further embodied process steps, the chemically bound hydrogen in the LOHC may be reversibly removed and recovered during a subsequent dehydrogenation step without decomposing the underlying substrate structure of the carrier, this hydrogen being termed "labile" hydrogen.

In one embodiment of the present disclosure, the hydrogenation involves supplying the S-LOHC as a hydrogenation zone feedstock, either in liquid or vapor phase or mixed phase, to a hydrogenation reactor. A suitable hydrogenation catalyst within the reactor is maintained at a temperature in a range of between 200 to 300° C. and at a positive pressure of up to 20 bar, and the hydrogenation catalyst may be powdered or in extrudate form, or similar reactive form with a sufficiently high surface area. In one embodiment, the catalyst may comprise a metal, such as nickel, cobalt, or a mixture thereof, and the metal mixture may further be compounded with molybdenum. In another embodiment, the hydrogenation catalyst may comprise palladium, platinum, or a mixture thereof. The metal composition may be supported on an oxide material comprising, for example, alumina, silica, titania, or a mixture thereof in any ratio. An additional component or alternative support may include an acidic zeolite with 10 or 12 angstrom ring openings such as faujasite, Beta zeolite or ZSM-5. The hydrogenation catalyst composition may be sulfided prior to use. The hydrogenation reaction may be conducted in an existing refinery having suitable catalyst reaction and support facilities to produce the S-LOHC product with a purity suitable for use in the present process.

In some embodiments, the hydrogen gas supplied for the hydrogenation reaction is renewable "green" hydrogen produced, for example but not limited to electrolysis of water using renewable energy. In closely related embodiments, at least a portion of the hydrogen supplied for the hydrogenation reaction is termed "blue" hydrogen, produced, for example by hydrocarbon oxidation with carbon capture and storage (CCS), by partial oxidation or thermal pyrolysis of biomass, and/or by hydrocarbon pyrolysis with solid carbon capture. Using either form of renewable hydrogen to store electricity by means of conversion to labile hydrogen content present in a R-LOHC product according to the present disclosure provides an overall process that is CN with respect to the hydrogen and its source.

LOHC Compositions and Products

In the embodiments of the present disclosure, the hydrogenated LOHC product from a hydrogenation step is a hydrogen-enriched R-LOHC product. A desirable objective for hydrogenation is to produce a fully hydrogenated product, i.e., MCH from hydrogenated toluene, or cyclohexane from benzene, when these component hydrocarbons are employed However, the process will operate under conditions that chemically binds less than the maximum amount of labile hydrogen in the R-LOHC. In one embodiment, the hydrogen-enriched LOHC product (R-LOHC product) contains at least or greater than 5 wt % chemically bound labile hydrogen. In another embodiment, the R-LOHC product from hydrogenation contains at least or greater than 6 wt % chemically bound labile hydrogen.

The LOHC product suitable for use herein include hydrogenated organic substrates selected from mono- and polycyclic compounds, mono- and polycyclic heterocyclic compounds and homocyclic compounds, including both their saturated and unsaturated forms, including their fully hydrogenated, partially hydrogenated and fully dehydrogenated states depending on where within the process the LOHC product is being employed, enriched or harvested for labile hydrogen, as described in the various embodiments herein. The hydrogenated form of the LOHC releases chemically bound hydrogen via dehydrogenation, resulting in a fully or partially dehydrogenated form of the LOHC. Both the hydrogenated and dehydrogenated forms are liquids at standard temperature and pressure (STP, being 0° C. and 1 bar).

The LOHC materials suitable for use herein are characterized also as an LOHC pair, with an at least partially hydrogenated form of the LOHC (i.e., R-LOHC product) being predominately one member of the pair, while an at least partially dehydrogenated form of the LOHC (i.e., S-LOHC product) as the other member of the LOHC pair. LOHC pairs suitable for the present invention include monocyclic pairs such as benzene/cyclohexane and toluene/methylcyclohexane. Exemplary homopolycyclic LOHC pairs include the decalin/naphthalene and perhydro-benzyl toluene/benzyl toluene pairs. Exemplary heteropolycyclic LOHC pairs include the 1-methyl perhydro indole/1-methyl indole, 1,2-perhydrodimethyl indole/1,2-dimethyl indole, and perhydro dibenzyl toluene (18H-DBT)/dibenzyl toluene (OH-DBT) systems. (See Rao, et al., Energies 2020, 13(22), 6040, and Wunsch, et al., Materials 2020, 13(2), 277).

As shown in equation (1) below, the dehydrogenation of an R-LOHC, e.g., methylcyclohexane used as a non-limiting example, generates an S-LOHC, e.g., toluene, and three molecules of hydrogen gas. The three molecules of hydrogen gas are termed "labile hydrogen" to indicate that they may be reversibly removed by dehydrogenation and the equivalent added back to the complementary molecular pair molecule (here, methylcyclohexane) by subsequent hydrogenation. Toluene generated by dehydrogenation may be reversibly hydrogenated to methylcyclohexane without otherwise decomposing or otherwise degrading the underlying cyclic structure, being aromatic types of molecules or containing at least one aromatically convertible ring Accordingly, as used herein, the resulting LOHC product may also be termed a "recyclable LOHC" product.

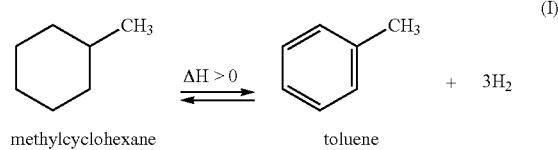

(I)

methylcyclohexane     toluene

The LOHC pair designation is thus fully represented by two interconvertible chemical structures, one being fully dehydrogenated and one being fully hydrogenated. By "fully dehydrogenated" is meant to indicate that all of the labile hydrogen atoms have been removed, leaving the resulting molecule in its aromatic substrate form. In the case of the toluene/MCH pair, the toluene molecule is the fully dehydrogenated species, having the aromatic substrate form. By "fully hydrogenated" is meant to indicate that all of the sites on the molecule available for labile hydrogen attachment are occupied, being the most fully hydrogen saturated form. In the case of the toluene/MCH pair, the MCH molecule is the fully hydrogenated species. Other examples include the benzene/cyclohexane pair or the decalin/naphthalene pair. In further embodiments, the R-LOHC representation for the hydrogenated form includes partially hydrogenated forms as well as the fully hydrogenated form, depending in part on the nature of the LOHC product feed at various stages of processing according to the disclosure methods herein. Likewise, the S-LOHC representation for the dehydrogenated form includes partially dehydrogenated forms, again depending in part on the nature of the LOHC product be used or processed as a LOHC product feed at various stages of the disclosed processes herein. It will be understood, therefore, in reference to a particular composition, method or process using the disclosed compositions, that the S-LOHC form will contain relatively fewer hydrogen atoms than the R-LOHC form in that exemplary process or composition. In one embodiment, the R-LOHC form contains greater than 5 wt % labile hydrogen that may be chemically removed by dehydrogenation, and the resultant S-LOHC form may contain less than 5 wt % labile hydrogen after use in one or more processes or in use to generate electricity or hydrogen in a usage application.

In these embodiments the LOHC, either in its R-LOHC or S-LOHC form may be in a purity of up to 100% with respect to available or labile hydrogen content. In alternative embodiments, the LOHC product may comprise at least about 80 wt % of a single LOHC species, or alternatively at least about 90 wt % of a single LOHC species, or alternatively a range from 90-99.9 wt % of a single LOHC species, or yet alternatively a range from 95 to 99 wt % of the LOHC species.

The S-LOHC feed suitable for use herein for supplying a hydrogenation reaction may be synthesized from conventional petroleum sources. At least a portion of the S-LOHC feed may be recovered as liquid phase recycle from a dehydrogenation reaction as described herein. In further embodiments, one or both of petroleum-based components and recycle S-LOHC based components may be present in the S-LOHC feed, in a ratio (1:1) from 100% petroleum-based to 100% recycle based component, or at any intermediate ratio. It will be generally desirable, for reasons of resource and energy utilization and environmental impact, to maximize the amount of recycle based component in the S-LOHC feed, with a petroleum component added as import feed to make up for any shortfall in recycle component availability. In such embodiments, the LOHC feed blend may contain more than 5% recycle, or alternatively in some situations a range from 10% to 95% recycle component.

Large-Capacity Flow Battery

The primary hydrogenation product derived from the disclosed methods and processes described herein, a hydrogen-enriched carrier (R-LOHC), may be stored as a processable energy source as electricity supply and demand varies over time, thus operating as a large-capacity "flow battery" in which the energy is stored in a chemical form. The capability of storing energy in the form of an R-LOHC is limited solely by available liquid storage, without the need for refrigeration, compression or pressurized tanks. For example, as a storage medium, a 500,000 bbl (barrel)_tank containing R-LOHC may be converted to produce 67.5 GWh (gigawatt hours) of electricity. During periods of high electricity demand, the R-LOHC may be converted by a catalytic dehydrogenation reaction into hydrogen gas and a S-LOHC byproduct. The hydrogen gas may then be electrochemically converted in an electrochemical cell to generate electricity for export and/or for internal use in one or more of the disclosed processes steps herein.

The R-LOHC may be stored at ambient conditions for use when needed. The stored R-LOHC may serve as a potential source of energy for many uses. According to one or more of the disclosed embodiments, at least some of the stored R-LOHC may be internally converted to generate electricity, either for internal use or for exporting to the electricity grid in order to compensate for deficiencies in the grid electricity supply. Alternatively, at least some of the stored R-LOHC may be exported for use in generating electricity as described herein at a remote site, and yet alternatively at least some of the stored R-LOHC may be provided to vehicles for electrical propulsion energy and obtaining water as the primary byproduct. Additionally, unreacted hydrogen gas released into the electrochemical cell exhaust may be recycled as a hydrogen feed component to that or another electrochemical cell. In some embodiments, the recycled hydrogen may be conditioned during a recycle process to increase hydrogen purity and to adjust the temperature and/or the pressure of the recycle hydrogen to make the recycle stream compatible with fresh hydrogen feed that is to be provided to the electrochemical cell.

In one embodiment, the feed to the catalytic hydrogenation unit is S-LOHC wherein at least a portion of the S-LOHC hydrogenation reaction feed may be supplied as recycle S-LOHC derived from a hydrogenation reaction according to the disclosed methods herein. Any shortfall in the availability of recycle S-LOHC may be supplied by import S-LOHC derived from another source. The hydrogen feed to the hydrogenation reaction may be green or blue hydrogen so that the use of renewable hydrogen to store electricity in the R-LOHC serves to provide an overall process that is carbon-neutral (CN) with respect to the hydrogen that is electrochemically converted to generate CN electricity in the embodied process steps described herein.

Deficit Electrical Period Operation

During periods of low electricity production and/or high electricity demand, the stored R-LOHC serves as a flow battery for generating electricity via dehydrogenation of the R-LOHC and electrochemical conversion of the product hydrogen, generating electricity. The R-LOHC is dehydrogenated in a dehydrogenation reactor according to the present disclosure containing dehydrogenation catalyst that serves to liberate hydrogen gas, which is purified, often by chilling, prior to processing using the disclosed PEMFC or SOFC equipment where the hydrogen gas is electrochemically converted to CN electricity and water. The CN electricity generated in the fuel cells may be routed to the demands of an electrical grid, while the water generated by the fuel cells may be recovered and stored to provide water for the electrolyzer needs or for other usages.

Primary LOHC component

The overall process is intended to be operated at conditions necessary to maintain an essentially carbon-neutral operation. Thus, according to the disclosed embodiments of the process detailed herein, the blended LOHC feed composition, in response to that objective, contains a primary component consisting of an at least partially hydrogenated LOHC having a cyclic chemical structure and an added secondary component consisting of an at least partially hydrogenated LOHC having a cyclic chemical structure derived from CN carbon. The primary component may contain greater than 5 wt % labile hydrogen, while the blended LOHC feed composition contains sufficient carbon-neutral carbon originating from the secondary component to compensate for carbon emissions when the feed composition is dehydrogenated, and the product hydrogen gas is subsequently electrochemically converted to produce electricity.

In the disclosed embodiments, at least a portion of the primary component may be supplied from the hydrogenation reaction. As such, at least a portion of the primary LOHC component may be synthesized from conventional petroleum sources, including, for example, by catalytic hydrogenation of S-LOHC from a petroleum source. The labile hydrogen contained in the blended LOHC feed may be added by catalytic hydrogenation of S-LOHC, using green or blue hydrogen as the reactant hydrogen. At least a portion of the primary component of the LOHC feed blend may be derived as S-LOHC that is recovered as liquid phase recycle from a dehydrogenation reaction as described herein and catalytically hydrogenated to form the R-LOHC. One or both of petroleum-based component and recycle S-LOHC based component may be present in the primary component, in a ratio from 100% petroleum-based to 100% recycle based component, or at any intermediate ratio.

Secondary LOHC Component

In the disclosed embodiments, the secondary LOHC component is a cyclic hydrocarbon having a chemical structure similar to that of the primary component and with structural carbon atoms of differing isotopic signature that are derived from renewable precursors. The secondary component may contain greater than 5 wt % labile hydrogen. By reason of the origin of the carbon atoms in the secondary LOHC component, the secondary LOHC component is carbon-neutral with respect to carbon emissions. In effect, the quantity of carbon atoms that are exhausted in the embodied processes and in the operation of the power modules as disclosed herein are at least matched by the quantity of carbon atoms present in the secondary LOHC component that is contained in the LOHC blend feed.

The amount of secondary LOHC component in the blended LOHC feed may be determined using, for example, ASTM D6866-21 Method B, entitled "Standard Test Methods for Determining the Biobased Content of Solid, Liquid, and Gaseous Samples Using Radiocarbon Analysis".

In one embodiment, the secondary LOHC is produced from a plant or animal biomass source. Biomass from plant or animal sources can be purposely grown energy crops, wood or forest residues, waste from food crops, horticultural waste, or food processing residues. Production of LOHCs from biomass generally involves one or more biomass conversion steps, such as pyrolysis, gasification, anaerobic digestion, or fermentation. Typical reaction products from these processing methods include one or more of methanol, ethanol, methane, acetic acid, lactic acid, and syngas. One or more of these biomass conversion products may be used to generate an aromatic precursor of the carbon-neutral carrier. An exemplary process for converting ethanol to BTX over a Zr-modified ZSM-5 that has been described in the art. On effect, the carbon contained in the secondary LOHC derived from biomass has been removed from the atmosphere as atmospheric $CO_2$ that is converted through one or more chemical processing steps to a secondary LOHC component suitable for use in the disclosed embodiments herein. The secondary component of the LOHC feed is therefore carbon-neutral with respect to the carbon contained therein, and to any processing step involving the secondary component.

In one embodiment, the secondary LOHC is synthesized through one or more steps from CO2 that is removed from the atmosphere by direct air carbon capture from flue gas, various processes for achieving this being well known in the art. In one embodiment, the secondary LOHC is synthesized through one or more steps from precursor molecules, in a process that includes solid carbon capture or $CO_2$ sequestration.

LOHC Blend

In one embodiment, the LOHC feed blend is produced by blending an R-LOHC hydrogenation product as the primary component with a relatively lesser amount of a secondary component. Blending may take place as the primary component from hydrogenation is supplied to a storage vessel, within the storage vessel itself, or as the feed is supplied to the dehydrogenation reactor, wherein. the LOHC feed blend that is supplied to the dehydrogenation reactor contains from 0.5-10 wt % secondary component, based on the total fuel blend, the balance being the primary component.

Dehydrogenation

The dehydrogenation reaction process described in various embodiment herein converts at least a portion of the R-LOHC feed blend to gaseous hydrogen and a liquid S-LOHC product. At least 80 wt %, and in another embodiment at least 90 wt %, and in another embodiment at least 95 wt % of the labile hydrogen contained in the R-LOHC feed blend may be recovered as gaseous hydrogen following catalytic dehydrogenation.

The dehydrogenation reaction zone may be a fixed bed, multi-tube reactor, with each of a plurality of reaction tubes filled with particulate dehydrogenation catalyst contained within a reactor shell. Thermal energy needed to maintain the reaction zone temperature and to overcome the endotherm of the dehydrogenation reaction is generated within the power module. Sources of thermal energy may include one or more of an on-board combustion chamber, thermal energy generated during operation of the electrochemical conversion device, or electrical energy. Dehydrogenation reaction conditions may include an average catalyst temperature in the range of 250 to 600° C., or in a range of 350 to 600° C., or in a range of 300 to 400° C., and a total pressure in the range of 1-5 Barg (gauge pressure in bars).

The dehydrogenation catalyst suitable for use herein generally comprises an active metal on an oxide support. Suitable active metals include, for example, nickel, platinum, palladium, rhodium, iridium, and ruthenium. The oxide support is a highly porous gamma alumina, silica, magnesia, or silica-alumina support having a surface area of greater than 302 $m^2$/g. In one embodiment, the catalyst is a particulate solid, comprising particulates in the form of irregular shaped particulates, powder particulates, cylindrical particulates, or spherical particulates, and having a diameter ranging from 0.1 mm to 5 mm. In one embodiment, reactor tubes through which the reacting fluid flows are coated on the inside surface of the tubes with a coating of a catalytic material.

The normally liquid S-LOHC product (i.e., liquid phase at ambient temperature and pressure) from dehydrogenation may include partially or fully dehydrogenated aromatic substrate of the LOHC. In the example embodiment of an R-LOHC feed blend containing MCH as the primary component, the S-LOHC dehydrogenation product may contain a toluene-enriched unloaded aromatic substrate as well as unreacted MCH, condensation compounds of MCH and reaction fragments from destructive decomposition of MCH. The S-LOHC dehydrogenation liquid product contains at least 60 wt % toluene; or at least 80 wt % toluene; or at least 95 wt % toluene, the remainder being non-toluene dehydrogenation reaction byproducts, such as MCH, partially dehydrogenated MCH, mixed xylenes, and multi-ring aromatics. In further embodiments, a corresponding S-LOHC dehydrogenation liquid product may contain the same alternative ranges of any suitable cyclic hydrocarbon as disclosed herein.

In one embodiment, the S-LOHC reaction product may be separated into two portions: a recycle liquid that may be passed to on-board storage; and a combustion liquid that may be passed to a combustion chamber for generating the thermal energy used in a power module. The fraction of the S-LOHC that is recovered as combustion liquid is metered to the combustion chamber, with the CN carbon contained in the R-LOHC feed blend being equal to or exceeding the carbon contained in the combustion liquid, thus maintaining overall carbon-neutral operation.

In one embodiment, the recycle liquid is withdrawn from the power module for recycle, hydrogenation and reuse as an R-LOHC feed. In another embodiment, the recycle liquid is sent to an offsite processing facility for hydrogenation or other uses. The S-LOHC may be preconditioned prior to hydrogenation, including purification and adjustments to the S-LOHC pressure and temperature. Reaction products from dehydrogenation include hydrogen and an S-LOHC.

Purifying Hydrogen

Producing purified hydrogen for electrochemical conversion generally involves separating a gaseous hydrogen phase from the normally liquid components of the dehydrogenated product, using one or a combination of liquid condensation, membrane separation, or filtration. One or more stages of separation may be used. In at least one of the stages, a refrigeration cycle may be included to facilitate separation of the remaining normally liquid components from the gaseous hydrogen product. The hydrogen may be cooled to a sub-ambient temperature of 0° C. or lower, or alternatively −10° C. or lower, or alternatively −20° C. or lower, or alternatively −25° C. or lower. Chlorofluorocarbons that may be useful as refrigerants are described and well known in the art.

In addition to cooling, membrane separation or carbon filtration may be used in either the first cooling stage, the second cooling stage, or in both. The stages of purification are configured to produce a purified hydrogen stream with a purity of at least 99 wt %, or alternatively at least 99.5% or yet alternatively at least 99.9 wt %.

Combustion Chamber

Heat may be supplied for the dehydrogenation reaction via one or more of R-LOHC feed blend preheating, R-LOHC feed blend vaporization, or heat passed directly to the dehydrogenation reaction zone. The R-LOHC feed blend may be preheated via heat exchange prior to reaction to a temperature in the range of 250 to 400° C.

A combustion chamber may be provided for supplying heat to a power module as disclosed hereinbelow. Exemplary combustion chambers include a forced air furnace, micro gas turbine, a reciprocating engine or the like capable of burning hydrocarbons. Heat from the combustion chamber may be supplied as heated combustion exhaust gases that are passed directly to the dehydrogenation reaction zone to maintain dehydrogenation conditions and/or for preheating and/or vaporizing the dehydrogenation feed. Supplying heat for reaction may include using the exhaust combustion gases to heat a circulating heat transfer fluid for conveying heat for a reaction zone feed preheat step and/or for reaction zone temperature control.

Fuel Cell

Embodiments of the disclosed power module may contain a fuel cell electrochemical device for converting on-board generated hydrogen gas to electrical power. The fuel cell device generates electricity by conversion of chemical energy of the hydrogen fuel and air into electricity through a pair of redox reactions. Suitable fuel cells for use in the vehicle may be selected from an alkaline fuel cell (AFC), a proton-exchange membrane fuel cell (PEMFC), a phosphoric acid fuel cell (PAFC), a molten carbonate fuel cell (MCFC), an oxide ceramic or solid oxide fuel cell (SOFC), or the like. All may be operated according to one or more of the embodied process steps using atmospheric oxygen obtained from the environment as an oxidizer gas, with the result that no storage of oxygen gas is required. In further embodiments, the fuel cell device may comprise one or more individual fuel cell units, operated either in serial or parallel mode as needed.

The electrochemical conversion device suitable for use herein for converting carbon-neutral hydrogen to electrical power may include a solid oxide fuel cell (SOFC) device operating in a temperature range 400-650° C. Approximately 30-35% of the energy generated in the SOFC is thermal energy that is suitable for at least partially maintaining the dehydrogenation reaction zone temperature. Gases exhausted from the anode side of the SOFC system include unreacted hydrogen and a small amount of S-LOHC that was carried along with hydrogen feed to the SOFC from a dehydrogenation zone. In another embodiment, gases exhausted from the cathode side of the SOFC system, including oxygen depleted air and water vapor, may be combined with the anode exhaust stream in a catalytic conversion unit, which produces water, oxygen depleted air and $CO_2$ from aromatic liquid oxidation. An R-LOHC feed blend for use with the SOFC device may be contain in a range of 0.1-10 wt % of a secondary R-LOHC component in order to maintain the overall carbon-neutral process.

Additional suitable electrochemical conversion devices for converting carbon-neutral hydrogen to electrical power may include a proton-exchange membrane fuel cell (PEMFC) operating in a temperature range 50-100° C. Only a small portion, if any, of the heat generated by a PEMFC may be available for use with the dehydrogenation reaction zone. The remaining heat for dehydrogenation when employing a PEMFC fuel cell device may in one embodiment be provided by combustion of a portion of the combustion liquid. In this case, an R-LOHC feed blend for use with the PEMFC unit may contain in a range of 0.1-25 wt %, or, alternatively 0.5-15 wt %, or alternatively 1-10 wt % of a secondary R-LOHC feed component in order to maintain the overall carbon-neutral process.

The electricity generated in the fuel cell electrochemical device may be used internally for heat or propulsion, or exported to the electrical grid. Export electricity is important for compensating for reduced generation rates from renewable energy that supplies the electrical grid.

Dual Purpose Electrochemical Cell

In one embodiment, the electrochemical cell may serve a dual purpose as an electrolyzer under electrolysis conditions and as a fuel cell under fuel cell conditions. Under electrolysis conditions, an electric current is passed to the cell that is in contact with water or an aqueous solution to generate hydrogen. Under fuel cell conditions, purified hydrogen is supplied to the anode of the fuel cell and oxygen, generally as air or an oxygen-enriched air stream, is supplied to the cathode. In embodiments employing dual purpose cells, electricity generated in the electrochemical conversion reaction may be passed from the fuel cell to an external circuit. Dual purpose proton exchange membrane cells operate as an electrolysis cell (PEMEC) and as a fuel cell (PEMFC) at temperatures of generally less than 100° C. and often in a range of 50-80° C., though experimental versions that operate at higher temperatures are known in the art. Dual purpose solid oxide cells operate as an electrolysis cell (SOEC) and as a fuel cell (SOFC) at temperatures of generally 500-850° C., though experimental versions that operate at lower temperatures are known.

Figure 2:
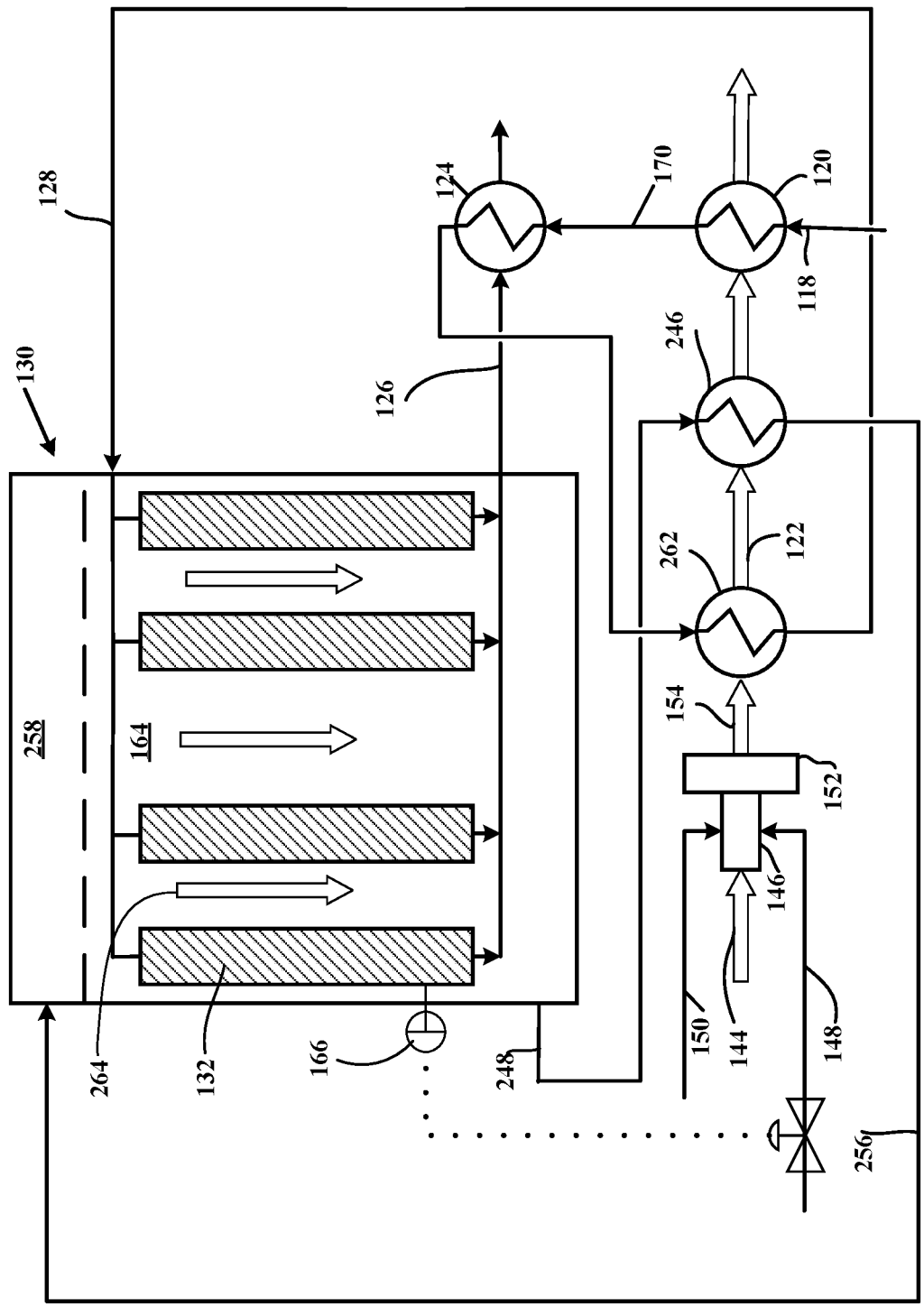
FIG. 2 illustrates a schematic of an embodiment for supplying heat to a dehydrogenation reaction zone to generate hydrogen for conversion in a PEMFC.
Figure 3:
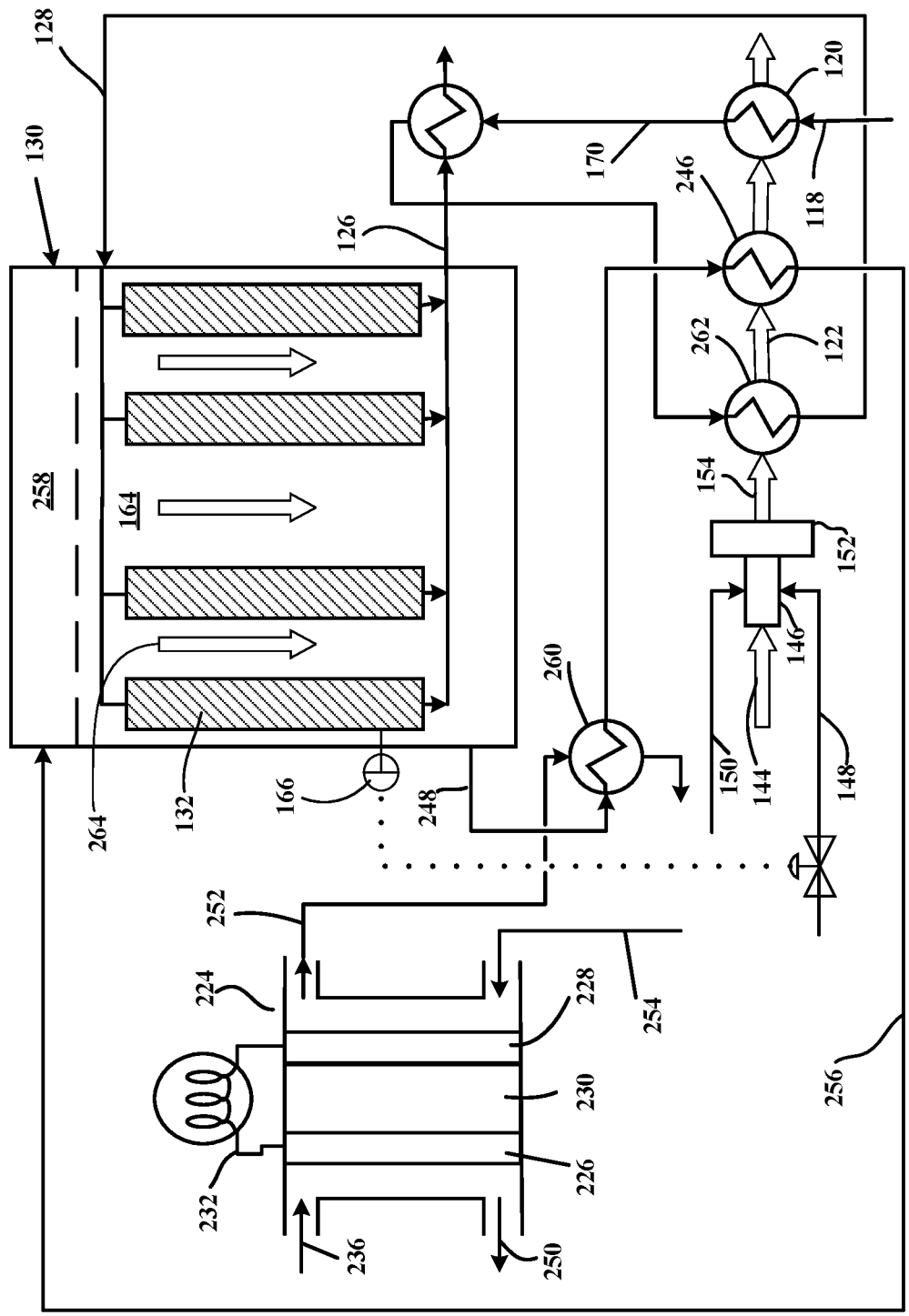
FIG. 3 illustrates a schematic of an embodiment for supplying heat to a dehydrogenation reaction zone to generate hydrogen for conversion in a SOFC.

The embodiments of present the disclosure illustrated in FIGS. 1-3 include a process that is integrated into an electricity generating utility grid capable of supplying fossil fuel based and/or renewable energy sourced electricity. As electricity output and electricity demand may vary over time, the exemplary processes illustrated in FIGS. 1-3 provide for storing electric energy in the form of an R-LOHC product during periods of low electricity demand and/or increased electricity supply, and for providing CN electricity for the grid during periods of high electricity demand and/or decreased electricity supply.

Specific non-limiting embodiments of the inventive process as disclosed herein are illustrated by the appended figures and the following descriptions.

According to the embodiment illustrated in FIG. 1, fresh LOHC containing 6.5 weight % hydrogenated carbon-neutral component is supplied from an external source 108 to storage vessel 110. Fresh LOHC feed 112 from fresh feed portion 240 of storage container 110 is pressurized through pump 114 to approximately 3.0 Barg (gauge pressure in bars); the flow rate is controlled by control valve 116. The pressurized feed 118 is preheated in heat exchange unit 120 to approximately 160° C. by exchange with combustion exhaust gas 122, then in heat exchange unit 124 to a temperature of approximately 340° C. by heat exchange with the reactor effluent stream 126 and finally to 475° C. by heat exchange 262 with exhaust gases 154 from combustion chamber 152. Preheated reactor feed 128 then passes into dehydrogenation reaction zone 130, the reaction zone comprising a multiplicity of reactor tubes 132 containing hydrogenation catalyst.

The dehydrogenation of MCH to toluene and hydrogen is endothermic and requires external heat. Air 144 supplied to a combustion chamber mixing box 146 is combined with an unloaded aromatic substrate comprising toluene 148 and waste hydrogen 150 recovered from the electrochemical conversion device 224; combustion occurs in the combustion chamber 152 and the combustion gases 154 are supplied to preheat the reactor feed 262 and then to the shell side 164 of reaction zone 130 for maintaining the temperature in the catalyst containing reactor tubes 132 at the dehydrogenation reaction temperature. Up to 6.5% of the unloaded aromatic substrate is burned to provide dehydrogenation energy, equal to or less than the weight % of hydrogenated carbon-neutral component in the LOHC feed, thus maintaining the process as a carbon-neutral process.

Cooled reactor effluent 178 leaving heat exchange unit 124 is further cooled to approximately 50° C. in fin-fan heat exchange unit 180; from there it enters 1st separation unit 184 where the gaseous hydrogen 186 is separated from the liquid toluene 188. Hydrogen 186 leaving 1st separation unit 184 overhead at approximately 90% purity is cooled in heat exchange unit 190 to approximately 5° C. and further chilled by refrigerant 192, that is generated in refrigeration unit 194, in heat exchange unit 196 to approximately −25° C. prior to entering 2nd separation unit 198 where further separation of hydrogen 200 and toluene 202 occurs. Toluene 202 from the base of 2nd separation unit 198 is returned to 1st separation unit 184. The hydrogen stream 200 exiting 2nd separation unit 198 is charcoal filtered to approximately 99.96% purity in charcoal filer 204. Purified hydrogen stream 206 then cools hydrogen stream 186 in heat exchange unit 190 and is then heated by hydrogenation reactor effluent 208 to approximately 190° C. in heat exchange unit 212 and combustion exhaust gas 122 in heat exchange unit 174 to 200° C. before entering hydrogenation reactor 210 where trace amounts (approximately 400 ppm) of toluene are converted to inert MCH. Hydrogenation reactor effluent 208 is cooled to 50° C. in feed/effluent heat exchange unit 212 and in fin-fan heat exchanger 218 and joins the anode gas hydrogen recycle stream 220 downstream of anode circulating compressor 222. Approximately 4% of the circulating anode gas stream is pulse-vented 150 to combustion chamber mixing box 146 to prevent inert build-up (primarily cathode side back-diffusion products) from impacting fuel cell performance.

The electrochemical conversion device is illustrated at 224. Purified hydrogen is supplied to anode side 226 through stream 236. Air 254 is supplied to the cathode side 228 to react with hydrogen, with ions exchanged between the anode side 226 and cathode side 228 through electrolyte layer 230. Electrons are routed via external wiring 232 to generate power. The anode exhaust stream 250 comprises unreacted hydrogen. Cathode exhaust stream 252 may comprise nitrogen and water vapor which is generated in the cathode reaction.

Liquid toluene 188 from the base of 1st separation zone 184 is routed to the spent fuel portion 238 of on-board storage vessel 110, for removal 242 from the process as needed, for recycle, and rehydrogenation using green/blue hydrogen into fresh MCH for reuse.

Up to 6.5% of the liquid toluene from 1st separation zone 184 is supplied as combustion toluene 148 in the combustion zone 152, thus ensuring that the process illustrated in FIG. 1 is carbon neutral, operating with net-zero carbon emissions.

FIG. 2 illustrates an embodiment of the dehydrogenation reaction zone 130 wherein the thermal energy from the combustion chamber is conveyed to the dehydrogenation reaction zone. The particular configuration represented in FIG. 2 is particularly suited for use with an electrochemical conversion unit such as a PEMFC. As noted, the dehydrogenation of MCH to toluene and hydrogen is endothermic and requires external heat. Air 144 supplied to a combustion chamber mixing box 146 is combined with an unloaded aromatic substrate 148 comprising toluene, and may comprise at least 75 weight % toluene, and waste hydrogen 150 recovered from an electrochemical conversion unit; combustion occurs in the combustion chamber 152 and the combustion gases 154 pass through heat exchange unit 262, preheating the reactor feed to 475° C., then through 246, for heating the heat transfer fluid 256 that is circulated to supply heat recovered from combustion to the reaction zone 130. Hot heat transfer fluid 256 may be passed to the reaction zone as a liquid phase fluid, a vapor phase fluid, or as a mixed liquid/vapor phase. An exemplary heat transfer fluid is Therminol 72 Heat Transfer Fluid from Eastman.

The shell side 164 of the dehydrogenation reaction zone 130 is flooded with the heat transfer fluid 264, to supply heat to the catalyst containing reaction tubes 132 within the reaction zone. Heat transfer may be enhanced by the condensation of vapor phase heat transfer fluid in operations which include supplying mixed phase heat transfer fluid to the reactor. Heat transfer fluid 248 exiting the reaction zone may be circulated at approximately 360° C. through heat exchange unit 246 where the temperature is raised to 395° C. by heated combustion gases from combustion chamber 152. Heated HTF 256 is passed to the distribution region 258 of the shell side 164 of the reaction zone 130, providing reaction heat. The reactor core temperature in the catalyst containing reactor tubes 132 is controlled at approximately 360° C. by temperature controller 166 which adjusts the flow of unloaded aromatic substrate 148 burned in the combustion chamber 152. A high temperature over-ride prevents the heating fluid from exceeding 400° C. Preheated reactor feed 128 enters the reaction zone 130 and reaction products exit the reactor at 126 at a temperature of approximately 350° C. Reaction products are cooled in heat exchange unit 124 with incoming heated feed 170.

Fresh LOHC feed 118 is preheated by combustion exhaust gases 122 in heat exchange unit 120 and are further heated to reaction temperature in feed/effluent heat exchanger 124.

FIG. 3 illustrates an embodiment of the dehydrogenation reaction zone 130 wherein the thermal energy from the combustion chamber is conveyed to the dehydrogenation reaction zone. The particular configuration represented in FIG. 3 is particularly suited for use with an electrochemical conversion unit such as a SOFC. As noted, the dehydrogenation of MCH to toluene and hydrogen is endothermic and requires external heat.

At least a portion of the heat for maintaining the dehydrogenation reaction temperature is supplied from the electrochemical conversion device 224. Hydrogen 236 is fed to the anode side 226 of the conversion device, where they react with oxygen ions, which pass from the cathode 228 to the anode 226 via the electrolyte layer 230, while electrons are routed via external wiring 232 to generate power. The anode exhaust stream 250 comprises unreacted hydrogen. Air 254 is supplied to the cathode side 228 of the conversion device 224. The cathode exhaust stream 252 comprising nitrogen and water vapor carries away the excess heat generated by the conversion device and is used to preheat the heat transfer fluid 248 in heat exchange unit 260.

Air 144 supplied to a combustion chamber mixing box 146 is combined with an unloaded aromatic substrate 148 comprising toluene, and may comprise at least 75 weight % toluene, and waste hydrogen 150 recovered from an electrochemical conversion unit; combustion occurs in the combustion chamber 152 and the combustion gases 154 pass through heat exchange unit 262 for preheating the reactor feed to 475° C., then through heat exchanger 246, for heating the heat transfer fluid 256 that is circulated to supply heat recovered from combustion to the reaction zone 130. Hot heat transfer fluid 256 may be passed to the reaction zone as a liquid phase fluid, a vapor phase fluid, or as a mixed liquid/vapor phase.

The shell side 164 of the dehydrogenation reaction zone 130 is flooded with the heat transfer fluid 264 to supply heat to the catalyst containing reaction tubes 132 within the reaction zone. Heat transfer may be enhanced by the condensation of vapor phase heat transfer fluid in operations which include supplying mixed phase heat transfer fluid to the reactor. Heat transfer fluid 248 exiting the reaction zone may be circulated at approximately 360° C. through preheater 260 followed by heat exchange unit 246 where the temperature is raised to 395° C. by heated combustion gases from combustion chamber 152. For operating conditions in which the cathode exhaust stream 252 contains enough heat energy to meet the heat requirements for dehydrogenation reactor operation and dehydrogenation reaction feed preheat in exchanger 120, the amount of unloaded aromatic substrate 148 supplied for combustion may be reduced or eliminated entirely.

Heated HTF 256 is passed to the distribution region 258 of the shell side 164 of the reaction zone 130, providing reaction heat. The reactor core temperature in the catalyst containing reactor tubes 132 is controlled at approximately 360° C. by temperature controller 166 which adjusts the flow of unloaded aromatic substrate 148 burned in the combustion chamber 152. A high temperature over-ride prevents the heating fluid from exceeding 400° C. Preheated reactor feed 128 enters the reaction zone 130 and reaction products exit the reactor at 126 at a temperature of approximately 350° C. Reaction products are cooled in heat exchange unit 124 with incoming heated feed 170.

Fresh LOHC feed 118 is preheated by combustion exhaust gases 122 in heat exchange unit 120 and are further heated to reaction temperature in feed/effluent heat exchanger 124.

Figure 4:
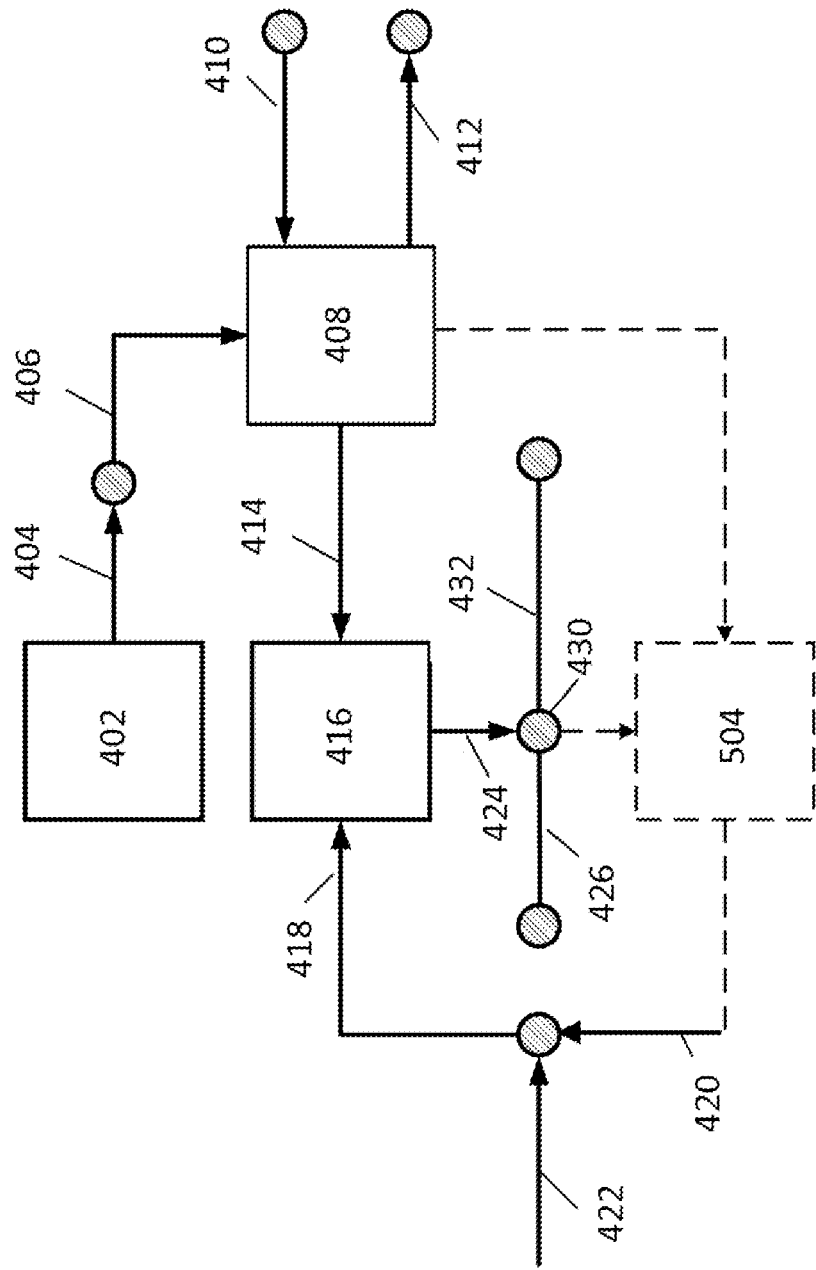
FIG. 4 illustrates an embodiment of a process for storing carbon-neutral (CN) electrical energy during periods when excess renewable electricity is available from the grid.

FIG. 4 illustrates a schematic representation of one embodiment of a process employed for operation during periods of relatively reduced electricity demand and/or during periods of relatively higher electrical output from the grid, giving rise to excess electricity availability, providing an opportunity to convert the excess electricity to its equivalent chemical potential in the form of a LOHC product. Process units, process steps and process streams in FIG. 4 that are active under these operating conditions are designated by solid lines while those steps, units and associated process elements that are on standby are designated by dashed lines. As shown in FIG. 4, a first step in the disclosed process is to convey some portion 406 of the electricity output 404 originating from an electricity generating utility grid 402 to an electrolysis unit 408 for the electrochemical conversion of incoming water feed 410 to produce generated hydrogen 414. In other embodiments in which the electricity from the utility grid is solely sourced from one or more renewable energy sources ("renewable electricity"), the hydrogen generated using the electrolysis unit 408 may be termed "green hydrogen" to identify it as having been generated with zero or negligible GHG emissions to the atmosphere.

In one embodiment, the electrolysis unit 408 is configured and controlled to reversibly operate as an electrolytic cell when electricity from the utility grid 402 is available for electrochemical conversion of water to hydrogen and oxygen, and to operate as a fuel cell for generating electricity by the electrochemical conversion of hydrogen to water when electricity from the utility grid 402 is not available or used. One non-limiting exemplary reversible electrochemical cell suitable for use herein is a solid oxide cell that operates as a solid oxide electrolyzer cell (SOEC) when supplied with water and an electric current, and which operates as a solid oxide fuel cell (SOFC) to generate an electric current by the electrochemical conversion when provided with an input of hydrogen and air. Another non-limiting exemplary cell is a proton exchange membrane electrochemical cell (PEMEC) configured and operated in a similar manner as a reversible cell, using input electric current to generate hydrogen and oxygen when supplied with water and operating as a proton exchange membrane fuel cell to generate an electric current by the electrochemical conversion of input hydrogen and air when operated in a reverse manner. In other embodiments, other reversible fuel cell/electrolyzer devices may be suitable used in place of 408.

In a further embodiment as shown in FIG. 4, generated hydrogen 414 produced by the electrolysis unit 408 is compressed to approximately 10 Barg (gauge pressure in bars) and used to hydrogenate an S-LOHC feed 418 in a hydrogenation unit 416 operating at approximately 220° C., while export oxygen 412 produced in 408 may be used to reduce emissions in furnaces or refinery processes such as Fluid Cat Crackers (FCCs) when co-located in oil refineries or other industrial locations, or alternatively in other embodiments, collected and stored for other uses.

In another embodiment, catalytic hydrogenation in unit 416 may be preceded by one or more conditioning steps (not shown), wherein suitable conditioning steps include processing the generated hydrogen 414 and/or the S-LOHC feed 418 to achieve the desired temperature, pressure and purity required for an efficient process. A CN component may also be blended in a first step with the S-LOHC feed 418 to the hydrogenation unit 416 prior to the subsequent step of hydrogenation of the resulting blend.

In further embodiment, the S-LOHC feed 418 is available for catalytic hydrogenation from one or more sources, including recycle S-LOHC 420 from a dehydrogenation reaction zone and/or an import S-LOHC 422 that may be sourced from petroleum or other sources, wherein any portion of the import or recycle S-LOHC that is derived from biological or renewable sources is not counted toward the CN content of the R-LOHC feed blend.

In yet a further embodiment, the hydrogenated R-LOHC 424 may be mixed with CN component 426, and the resulting R-LOHC feed blend 428 (not shown) may be stored in an R-LOHC feed blend storage vessel 430 and to supply export R-LOHC feed blend 432 to a storage tank, to an external customer, and/or to supply fuel cells during times of electrical deficit on the utility grid.

Figure 5:
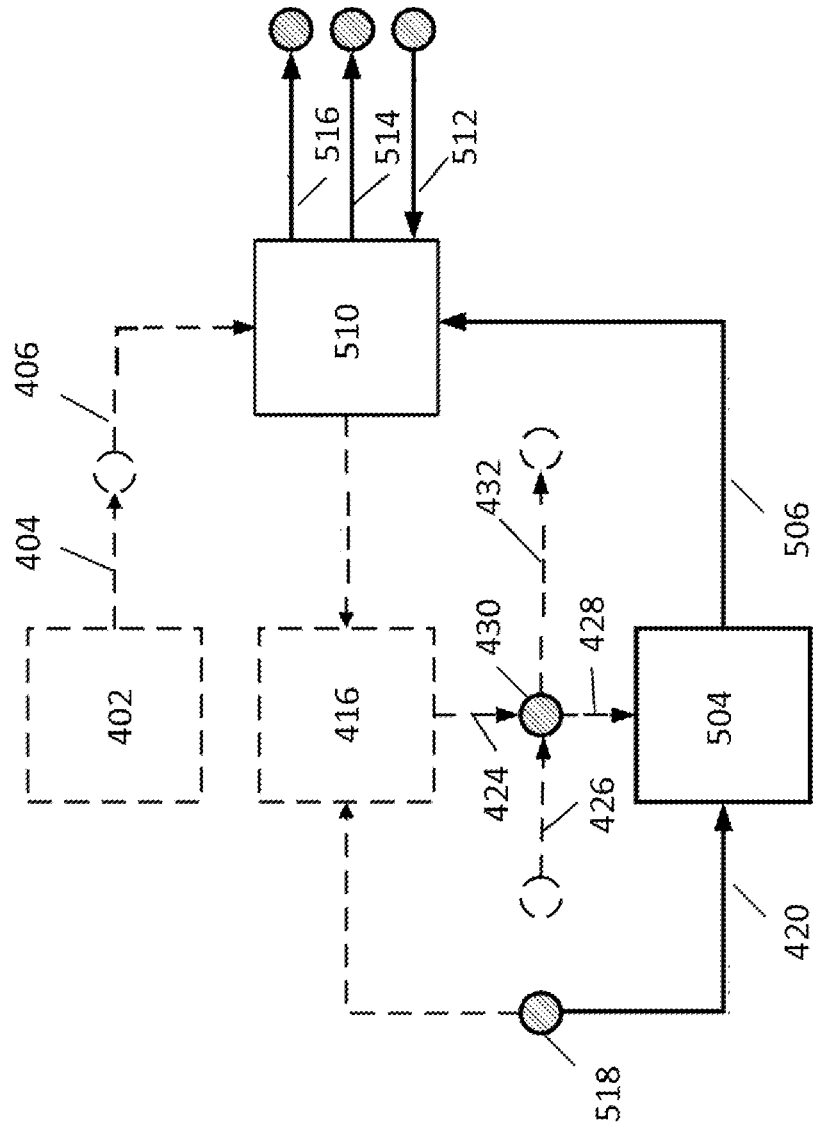
FIG. 5 illustrates an embodiment of a process for generating-CN electrical energy during periods when a reduced amount of electricity is available from the grid by converting hydrogen liberated from stored R-LOHC into CN electricity within a fuel cell.

FIG. 5 illustrates one embodiment of the disclosed process wherein the component units may be used for operation during periods of high electricity demand that may exceed the normal output of the electricity generating utility grid 402, or alternatively during periods of low electrical output from 402, wherein methods of the present disclosure provide for utilizing the process and apparatus to generate electricity under external deficit electrical conditions. Process units, process steps and process streams in FIG. 5 that are active under these operating conditions are designated by solid lines while those elements that are on standby are designated by dashed lines. Under these operating conditions, the utility grid 402 plays a reduced role in the process, as the disclosed process is now operated and controlled to supply export electricity 514 by processing an R-LOHC feed blend 428 in dehydrogenation unit 504. Reaction products from dehydrogenation unit 504 include hydrogen gas to be used as hydrogen fuel cell feed 506 and S-LOHC 508 (not shown) which may be reprocessed. In one embodiment, the generated gas 506 qualifies as a source or feed of "blue", or alternately "green" or, yet alternately "blue/green" hydrogen, depending on the precise nature of the source of an input feed 420 and/or feed blend 428 used to produce the generated gas. In a further embodiment, in a step after the hydrogen fuel cell feed 506 is conditioned as described herein in related embodiments, 506 may be supplied to fuel cell 510 for electrochemical conversion with oxygen gas supplied by means of an oxygen ($O_2$) fuel cell feed 512. Export electricity 514 generated in fuel cell 510 may be exported to the utility grid or used internally to one or more related embodiments of the disclosed processes herein. Fuel cell aqueous products 516 are produced during electricity generation by 510, water being the primary ingredient of 516, which may be further used in one or more embodiments of the disclosed processes herein, or extracted for other uses, such as to produce potable water. The resulting hydrogen depleted or "spent" S-LOHC product 508 (not shown in FIG. 5) may be returned to an S-LOHC storage vessel, such as 518 for subsequent reprocessing and hydrogenation to produce additional R-LOHC.

As illustrated in FIG. 5, export electricity 514 may be generated by converting an R-LOHC feed blend 428 in dehydrogenation unit 504. Reaction products from dehydrogenation include hydrogen 506 and S-LOHC 508. After one or more optional conditioning steps (not shown), the product hydrogen 506 may be supplied to fuel cell 510 for electrochemical conversion with oxygen gas ($O_2$) 512 supplied to the fuel cell. Electricity 514 generated in the fuel cell may be exported to the grid in one embodiment, or a portion of the generated electricity may be used internally in the process as needed in further embodiments. The electrochemical conversion of hydrogen generates water 516 as a byproduct. The water may be exported for external use. The S-LOHC product 508 (not shown) may be supplied to S-LOHC storage vessel 518 for subsequent reprocessing and hydrogenation to produce additional R-LOHC.

In a related embodiment, a CN component may be blended into a R-LOHC product, either using one or more of the processes disclosed herein at a process location or at a third-party customer's location. In one embodiment as shown in FIG. 5, an R-LOHC feed blend 424 is processed and stored in an R-LOHC feed blend storage vessel 430 after blending with a predetermined amount of the CN component 426 to produce an export R-LOHC feed blend 432 containing the requisite amount of CN component based on the intended use and may exit the process to a storage tank or transported by pipeline, truck, railway or other means to another location for use.

Figure 6:
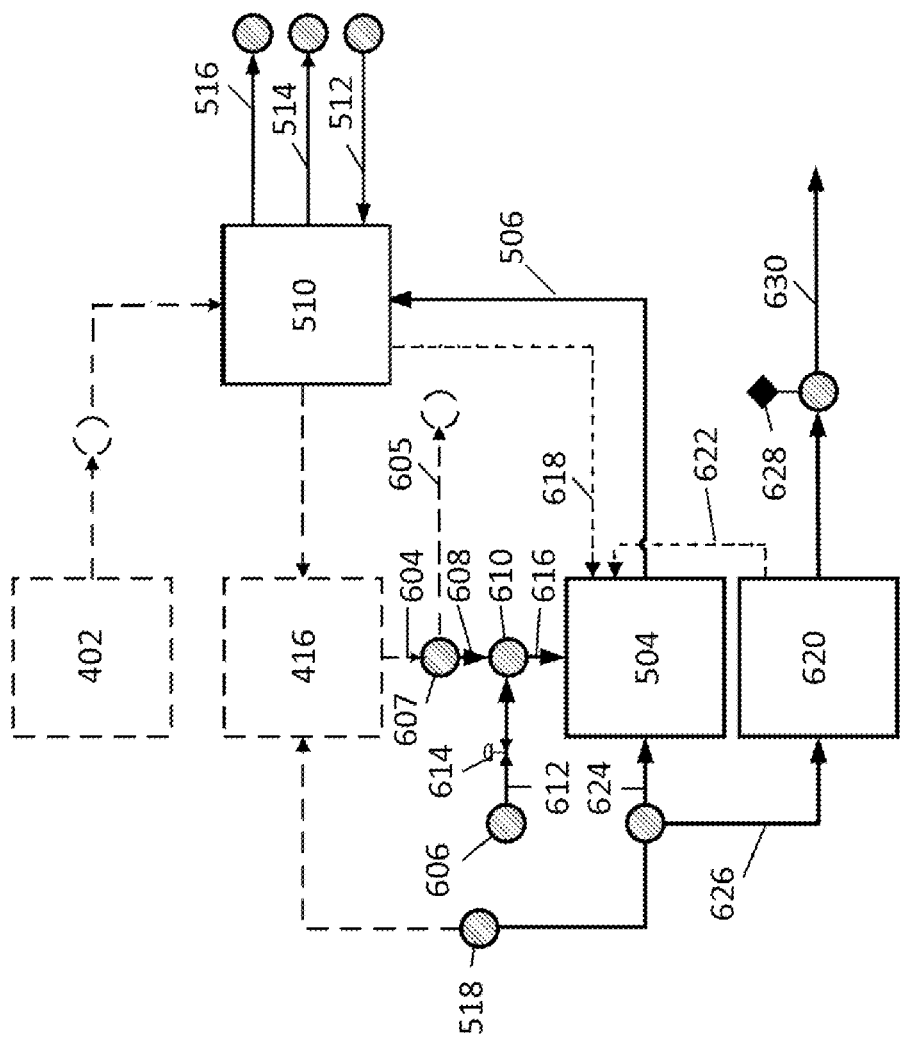
FIG. 6 illustrates an embodiment of a process, including combustion means to supply heat for operating a dehydrogenation reactor.

FIG. 6 illustrates an additional series of embodiments for carrying out the processes disclosed and described herein during periods of high electricity demand and/or low electrical output from the electricity generating utility grid 402, when decoupled from the grid. Process units, process steps and process streams illustrated in FIG. 6 that are active under these operating conditions are designated by solid lines while those elements that are on standby are designated by dashed lines, with the exception of 618 and 622, as described hereinbelow.

In one embodiment as illustrated in FIG. 6, a supply of R-LOHC 604 may be blended with a selected amount of a first CN component 606 to make a first LOHC feed blend 608 containing approximately between 0.1 to 10 wt % of the first CN component, or alternatively between 0.1 to 5 wt %, or yet alternatively between 0.1 to 1 wt % thereof. A portion of the first LOHC feed blend 608 may be extracted from the process as a first LOHC feed blend export stored in its corresponding storage vessel 610 for use in other local or remote process operations, suitably equipped vehicles or stationary devices. In another embodiment, the first LOHC feed blend 608, optionally stored and retrievable from the first LOHC feed blend storage vessel 610 may in an alternative embodiment be further blended using mixing valve 614 with a second CN component 612 to increase overall CN content in a resulting second LOHC feed blend 616 when desired. The addition of the second CN component 612 may be controlled by control valve 614 whose operation is to supply a requisite amount of carbon-neutral carbon that is at least equal to or greater than the amount of carbon emitted to the atmosphere by the embodied process. In one embodiment, the resulting second LOHC feed blend 616 that is produced that may be used as a supply feed for a further dehydrogenation step contains approximately between 1 to 10 wt % of overall carbon-neutral carbon (CNC) content resulting from the addition of the first and second CN components 606 and 612, respectively.

FIG. 6 also illustrates components and process steps in further embodiments in which thermal energy in the form of heat produced by the disclosed process is used to supply the requisite amount of heat required for efficient dehydrogenation, including, but not limited to heat supplied to preheat the dehydrogenation feed, heat to overcome the endothermic threshold of a dehydrogenation reaction and heat to maintain the dehydrogenation reactor at suitable reaction conditions. In one embodiment, at least a portion of the thermal energy needed for dehydrogenation is supplied by fuel cell heat 618 generated in the fuel cell 510, wherein fuel cell 510 may be an SOFC type fuel cell that is configured and operated to supply all of the heat required for dehydrogenation. Alternatively, in closely related embodiments to that immediately hereinabove, the fuel cell 510 may be of an SOFC type fuel cell or yet alternatively a PEMFC type fuel cell that is configured to supply some portion of the heat required for a dehydrogenation operation. Under these embodied processes, a combustor 620 may be provided to supply at least a portion of the generated thermal energy in the form of heat of combustion 622 needed for a dehydrogenation process. In a further embodiment as schematically illustrated in FIG. 6, a portion 626 of the S-LOHC product 624 stored in a S-LOHC storage vessel 518 and derived from a dehydrogenation process is then supplied to combustor 620, and at least a portion of the subsequent heat of combustion 622 generated by the combustion is supplied to the dehydrogenation reactor.

A carbon detector 628 may be provided to monitor the carbon emissions released from combustor 620 during the combustion process, including carbon oxides present in the combustor exhaust 660, which contains carbon dioxide. Many suitable carbon detectors are well known in the art, including detectors based on infrared detector technology. The carbon detector 628 may be configured to be in electrical communication with control valve 614 for supplying one or more of the disclosed CN components to be blended into the R-LOHC 604 product, the detected level of emitted carbon oxides being used to control the amount of either a first or second CN component containing a LOHC feed blend added for maintaining a net overall CN operation of the embodied processes as described.

In the embodiments disclosed above, the various processes and steps may be combined and performed in any suitable combination to provide for the storage of electrical energy from the grid as stored chemical energy in the form of labile hydrogen contained within an LOHC product, and subsequent harvesting of that labile hydrogen and electrical energy released by its conversion by dehydrogenation and subsequent conversion to electricity using combinations of hydrogenation and dehydrogenation reactions, electrolysis and recombination reactions, and combustion processes performed with the various LOHC products, blends and compositions as described. Further embodiments of the present disclosure include performance of the methods and process steps in various orders, including processes performed in repeated or cyclic orders to achieve an overall CN operation.

The above illustrations provide many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims.

Accordingly, it is appropriate that the appended claims be construed broadly and in a manner consistent with the scope of the invention, as set forth in the following claims.

What is claimed is:

1. A method for generating carbon-neutral electrical energy using hydrogen as the energy source, comprising:
   a. supplying a recyclable LOHC to a dehydrogenation reaction zone that is maintained at dehydrogenation reaction conditions, the recyclable LOHC comprising a hydrogenated recycle component, a predetermined target blend fraction of a hydrogenated carbon neutral component, and at least about 5 weight % carbon-neutral labile hydrogen that is available for removal by catalytic dehydrogenation,
   wherein the target blend fraction is defined as a proportion of a carbon-neutral component in an unloaded hydrogen carrier based on the total unloaded hydrogen carrier prior to hydrogenation to form the recyclable LOHC;
   b. catalytically dehydrogenating the recyclable LOHC in the dehydrogenation reaction zone and recovering gaseous hydrogen and an unloaded aromatic substrate therefrom;
   c. combusting an amount of the unloaded aromatic substrate that is less than or equal in weight % to the predetermined target blend fraction to provide sufficient thermal energy to maintain the dehydrogenation reaction conditions;
   d. recovering the remaining amount of unloaded aromatic substrate; and
   e. converting at least a portion of the gaseous hydrogen generated by dehydrogenation in an electrochemical conversion device to generate the carbon-neutral electrical energy.

2. The method of claim 1, further comprising:
   a. forming the unloaded hydrogen carrier comprising a recycle component and the carbon-neutral component; and
   b. adding carbon-neutral hydrogen to the unloaded hydrogen carrier by catalytic hydrogenation to form the recyclable LOHC comprising the hydrogenated recycle component and the hydrogenated carbon-neutral component;
   c. the unloaded hydrogen carrier being characterized by a labile hydrogen content of at least about 5 weight %.

3. The method of claim 1, further comprising:
   a. adding carbon-neutral hydrogen by catalytic hydrogenation to a recycle component to form the hydrogenated recycle component;
   b. adding carbon-neutral hydrogen by catalytic hydrogenation to the carbon-neutral component to form the hydrogenated carbon-neutral component; and
   c. blending the hydrogenated recycle component with the hydrogenated carbon-neutral component to form the recyclable LOHC.

4. The method of claim 1, further comprising recycling at least a portion of the remaining amount of unloaded aromatic substrate as the recycle component to the recyclable LOHC.

5. The method of claim 1, wherein at least a portion of the recycle component is recovered from a hydrogen-to-electricity generation process.

6. The method of claim 5, wherein at least 10 weight % of the recycle component is recovered from a hydrogen-to-electricity generation process.

7. The method of claim 6, wherein the recycle component recovered from a hydrogen-to-electricity generation process comprises at least 50 weight % toluene.

8. The method of claim 1, wherein the hydrogenated carbon-neutral component is prepared from at least one carbon-neutral precursor.

9. The method of claim 8, wherein the carbon-neutral precursor is ethanol produced by fermentation of biomass, the ethanol being catalytically cyclized to form the carbon-neutral component.

10. The method of claim 8, wherein the carbon-neutral precursor is methanol produced from biomass, municipal solid waste, biogas, or recovered $CO_2$ from the atmosphere.

11. The method of claim 1, wherein the carbon-neutral component comprises at least 90 weight % carbon-neutral toluene.

12. The method of claim 1, wherein the carbon-neutral hydrogen is green hydrogen, generated by electrolysis of water using electrical energy that was generated from wind, solar, hydroelectric, or geothermal energy.

13. The method of claim 1, wherein the carbon-neutral hydrogen is blue hydrogen produced by hydrocarbon oxidation with carbon capture and storage (CCS), or by partial oxidation or thermal pyrolysis of biomass, or by hydrocarbon pyrolysis with solid carbon capture.

14. The method of claim 1, wherein the recyclable LOHC comprises at least 90 weight % MCH.

15. The method of claim 1, wherein the target blend fraction is in a range of 0.1-25 weight %.

16. The method of claim 2, wherein the unloaded hydrogen carrier comprises at least 20 weight % of the recycle component.

17. The method of claim 2, wherein the unloaded hydrogen carrier comprises at least 90 weight % toluene.

18. The method of claim 1, wherein the unloaded aromatic substrate recovered from the dehydrogenation reaction zone for recycle as the recycle component comprises toluene and dehydrogenation byproduct contaminants.

19. The method of claim 18, wherein the recycle component comprises at least about 70 weight % toluene and less than about 30 weight % dehydrogenation byproduct contaminants selected from one or more of MCH, partially dehydrogenated MCH, xylene, and multi-ring aromatics.

20. The method of claim 18, further comprising removing at least a portion of the dehydrogenation byproduct contaminants from the recycle component prior to or during the catalytic hydrogenation step.

21. The method of claim 1, wherein the recyclable LOHC contains sufficient hydrogenated carbon-neutral component to convert at least 80 weight % of the labile hydrogen contained in the recyclable LOHC to gaseous hydrogen during catalytic dehydrogenation of the recyclable LOHC.

22. The method of claim 1, wherein dehydrogenation reaction conditions include a dehydrogenation temperature in a range of 350° C. and 600° C.

23. The method of claim 1, wherein gaseous hydrogen and the unloaded liquid substrate are generated in the dehydrogenation process, and wherein from 0.1-25 weight % of the unloaded liquid substrate is available for combustion to maintain the dehydrogenation process at carbon neutral operating conditions.

24. The method of claim 1 further comprising combusting up to the target blend fraction of the unloaded liquid substrate in air to generate thermal energy for vaporizing and heating the recyclable LOHC to the dehydrogenation temperature and for maintaining the dehydrogenation temperature of the dehydrogenation reaction zone.

25. The method of claim 1 further comprising purifying the gaseous hydrogen recovered from the dehydrogenation reaction zone, prior to the step of converting at least a portion of the gaseous hydrogen in the electrochemical conversion device.

26. The method of claim 25 wherein the gaseous hydrogen recovered from the dehydrogenation reaction zone is chilled by refrigeration prior to passing the hydrogen to a PEM electrochemical conversion device.

27. The method of claim 25 wherein the gaseous hydrogen is cooled by refrigeration to −10° C. or lower to liquify contaminants remaining in the gaseous hydrogen and to isolate purified gaseous hydrogen having a purity of at least 99.9 weight %, for passing to the electrochemical conversion device.

28. The method of claim 25 wherein the gaseous hydrogen is further purified by use of a membrane capable of separating gaseous hydrogen from vapor phase toluene.

29. The method of claim 1, wherein the electrochemical conversion device is a PEMFC and the target blend fraction is in a range from 1-10 weight %.

30. The method of claim 1, wherein the electrochemical conversion device is a SOFC and the target blend fraction is in a range from 0.5-5 weight %.

\* \* \* \* \*